(12) United States Patent
Bronson et al.

(10) Patent No.: US 8,666,711 B2
(45) Date of Patent: Mar. 4, 2014

(54) RADIATION ANALYSIS SYSTEM AND METHOD

(71) Applicant: Canberra Industries, Inc., Meriden, CT (US)

(72) Inventors: Frazier Lester Bronson, Brandford, CT (US); Ramkumar Venkataraman, Middletown, CT (US); Andrey Leonidovich Bosko, Middletown, CT (US); Nabil Menaa, Courbevoie (FR); William Robert Russ, East Hampton, CT (US); Valery Vasilyevich Atrashkevich, Moscow (RU)

(73) Assignee: Canberra Industries, Inc., Meriden, CT (US)

( * ) Notice: Subject to any disclaimer, the term of this patent is extended or adjusted under 35 U.S.C. 154(b) by 0 days.

(21) Appl. No.: 13/674,649

(22) Filed: Nov. 12, 2012

(65) Prior Publication Data
US 2013/0173220 A1 Jul. 4, 2013

Related U.S. Application Data

(63) Continuation-in-part of application No. 12/293,343, filed as application No. PCT/US2007/006802 on Mar. 19, 2007, now Pat. No. 8,335,670.

(60) Provisional application No. 60/783,560, filed on Mar. 17, 2006.

(51) Int. Cl.
*G06F 7/60* (2006.01)
*G06G 7/48* (2006.01)
*G01N 37/00* (2006.01)
*G01D 18/00* (2006.01)
*G06F 17/18* (2006.01)
*H03F 1/26* (2006.01)

(52) U.S. Cl.
USPC ............ 703/5; 703/2; 703/7; 702/81; 702/85; 702/179; 702/189

(58) Field of Classification Search
None
See application file for complete search history.

(56) References Cited

U.S. PATENT DOCUMENTS 5,095,217 A 3/1992 Attix
5,541,415 A 7/1996 Shonka
(Continued)

FOREIGN PATENT DOCUMENTS

EP 1176431 A1 1/2002

OTHER PUBLICATIONS

R. Gunnink, "MGA: A Gamma-Ray Spectrum Analysis Code for Determining Plutonium Isotopic Abundances", vol. I, LLNL, Ca. UCRL-LR-103220, Apr. 3, 1990.

(Continued)

*Primary Examiner* — Omar Fernandez Rivas
*Assistant Examiner* — Nithya J Moll
(74) *Attorney, Agent, or Firm* — David W. Carstens; Kevin M. Klughart; Carstens & Cahooh, LLP

(57) ABSTRACT

A radiation analysis system/method that automatically optimizes the efficiency calibration of a counting system based on benchmark data and variable parameters associated with radiation source/sensor/environment (RSSE) combinations is disclosed. The system/method bifurcates RSSE context (SSEC) model parameters into WELL-KNOWN (fixed) parameters (WNP) and NOT-WELL-KNOWN (variable) parameters (NWP). The NWP have associated lower/upper limit values (LULV) and a shape distribution (LUSD) describing NWP characteristics. SSEC models are evaluated using randomized statistical NWP variations or by using smart routines that perform a focused search within the LULV/LUSD to generate model calibration values (MCV) and calibration uncertainty values (UCV) describing the overall SSEC efficiencies. Sensor measurements using the MCV/UCV generate a measurement value and uncertainty estimation value. An exemplary embodiment optimizes geometry models of radiation sources by benchmarking with respect to measurement data from spectroscopy detectors and/or dose rate detectors.

28 Claims, 32 Drawing Sheets

(56) References Cited

U.S. PATENT DOCUMENTS

| | | | |
|---|---|---|---|
| 6,228,664 B1 * | 5/2001 | Bronson et al. | 438/14 |
| 6,298,115 B1 * | 10/2001 | Nilsson | 378/65 |
| 6,453,223 B1 | 9/2002 | Kelly et al. | |
| 6,934,653 B2 | 8/2005 | Ritt | |
| 7,286,214 B2 | 10/2007 | Reinersman et al. | |
| 7,383,128 B2 | 6/2008 | Chandler | |
| 2006/0217925 A1 | 9/2006 | Taron et al. | |
| 2009/0094005 A1 * | 4/2009 | Den Boef et al. | 703/2 |

OTHER PUBLICATIONS

R. Gunnink, et al., "MGAU: A New Analysis Code for Measuring Uranium-235 Enrichments in Arbitrary Samples", Proceedings of a Symposium on International Safeguards, Vienna, Austria, Mar. 14-18, 1994: 541-546.

T. E. Sampson, T. A. Kelly, Duc. T. Vo, "Application Guide to Gamma-Ray Isotopic Analysis Using the FRAM Software", LANI, report. LA-14018, Sep. 2003.

R. Venkataraman, F, Bronson, V. Atrashkevich, B. Young, and M. Field, "Validation of in situ counting system (ISOCS) mathematical efficiency calibration software", Nucl. Instrum. Methods Phys. Res., Sect. A 442, 450-454, 1999.

Genie2000 Spectroscopy Software—Customization Tools, Version 3.2.1, Dec. 15, 2009, Canberra Industries.

P. Bevington and D. Robinson, Data Reduction and Error Analysis for the Physical Sciences, 2nd ed., pp. 141-147, McGraw-Hill, New York (1992).

W. Press, S. Teukolsky, W. Vetterling, and B, Flannery, Numerical Recipes: The Art of Scientific Computing, 3rd ed., Cambridge University Press, (2007).

J. Kennedy and R. Eberhart, "Particle swarm optimization," Proc. IEEE Int'l Conf. on Neural Networks, IV, Piscataway, NJ, pp. 1942-1948 (1995).

Venkataraman R et al., "Improved detector response characterization method in ISOCS and LabSOCS", Journal of Radioanalytical and Nuclear Chemistry, Kluwer Academic Publishers, DO, vol. 264, No. 1, Mar. 1, 2005, pp. 213-219, XP019251919, ISSN: 1588-2780 (the whole document).

Bonson F L et al., "Mathematical Calibration of GE Detectors, and the Instruments that Use Them", Nondestructive Assay and Nondestructive Examination Wastecharacterization Conference, XX, XX, Jan. 14, 1997, pp. 1-12, XP002910376 (the whole document).

Genie2000 Spectroscopy Software—Operations, Version 3.2.1, Dec. 15, 2009, Canberra Industries.

* cited by examiner

| No | Description | d.1 | d.2 | d.3 | d.4 | d.5 | d.6 | Material | Density | Ref. Conc. |
|----|-------------|-----|-----|-----|-----|-----|-----|----------|---------|------------|
| 1 | Box | 18 | | | | | | concrete | 2.35 | |
| 2 | Source - Top Layer | 250 | 500 | 500 | 500 | | | cellulos | 0.6 | 1.00 |
| 3 | Source - Layer 2 | 0 | | | | | | | 0 | 0.00 |
| 4 | Source - Layer 3 | 0 | | | | | | | 0 | 0.00 |
| 5 | Source - Bottom Layer | 250 | 0 | 0 | 0 | 0 | 0 | cellulos | 0.6 | 1.00 |
| 6 | Source - Concentrated | 0 | 0 | 0 | 0 | 0 | 0 | | 0 | 0.00 |
| 7 | Absorber 1 | 0 | | 2.6 | | 2.6 | | (none) | 0 | |
| 8 | Absorber 2 | 0 | | | | | | | 0 | |
| 9 | Source - Detector | 200 | | | | | | | | |

FIG. 19

```
# ISOCS geometry file exported by 'Geometry Composer'\

# The primary data are stored in file
# 'c:\genie2k\isocs\data\geometry\in-situ\complex_box\example_box.geo'
# The primary computational dil is 'COMPLEX_BOX'

~Geometry=COMPLEX_BOX
~Description=Radioactive Box
~Comment=TMO calc
~Detector=8448
~Convergence_%=1.000   ~LBTN=64
~MDRPN=4    ~CRPN=4
~LUnit=mm   ~PUnit=mm.Hg  ~TUnit=C   ~DUnit=g/cu.c
~APressure=760   ~ATemperature=22   ~RHumidity=30.0

~sd1=200.00
~sd3=2.60
~sd5=2.60
# Dimensions:
~d1.1=18.0000   ~d1.2=500.0000   ~d1.3=500.0000   ~d1.4=500.0000
~1mater=concrete   ~1density=2.350000  ~1Con=0.000000
~d2.1=250.0000   ~2mater=cellulos  ~2density=0.600000  ~2Con=1.000000
~d5.1=250.0000   ~5mater=cellulos  ~5density=0.600000  ~5Con=1.000000
~Energies_keV=   59.540,   121.780,   244.700,   344.280,
                661.650,   778.900,   810.760,  1112.070,  1173.240,    #
               1332.500,  1408.010,
~Error_'%'=      10.0,       10.0,       8.0,       8.0,       6.0,
                  6.0,        6.0,       4.0,       4.0,       #
                  4.0,        4.0,
~Output_Filename=example_box.eco
```

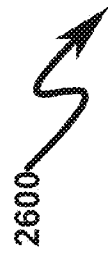

**Uranium 1
Uranium Carbide**

Known conditions:

Geometry type: Uranium Carbide item measured from the side
Uranium mass: ~800 g (confirmed by an expert)
235U abundance: 45 wt%
Total matrix mass: 2172 g Parameters assumed to be not well known, and varied during the optimization:
Fill height: 50 to 250 mm (uniform distribution)
Uranium wt%: varied from 30 to 79 wt% (step 1 wt%); remainder is Carbon
Total matrix mass: varied in a narrow range between 2171 and 2173 g
Density: derived from a total matrix mass and fill height

Uranium 2
Uranium Carbide

Known conditions:
Geometry type: Uranium Carbide item measured from the side
Uranium mass: ~897 g (confirmed by an expert)
235U abundance: ~53 wt%
Total matrix mass: 2281 g Parameters assumed to be not well known, and varied during the optimization:
Fill height: 20 to 250 mm (uniform distribution)
Uranium wt%: varied from 20 to 69 wt% (step 1 wt%); remainder is Carbon
Total matrix mass: varied in a narrow range between 2280 and 2282 g
Density: derived from a total matrix mass and fill height

FIG. 28

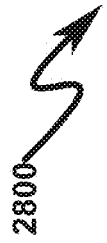

```
                    Uranium 3
                 Uranium Carbide

Known conditions:
Geometry type: Uranium Carbide item measured from the side
    Uranium mass: ~1606 g (confirmed by an expert)
     235U abundance: ~ 18.6 wt%
     Total matrix mass: 2741 g Parameters assumed to be not well known, and varied during the optimization:
    Fill height: 20 to 250 mm (uniform distribution)
Uranium wt%: varied from 30 to 79 wt% (step 1 wt%); remainder is Carbon
Total matrix mass: varied in a narrow range between 2740 and 2742 g
    Density: derived from a total matrix mass and fill height
```

| Optimization Results for Uranium Carbide Sources | | | | |
|---|---|---|---|---|
| Radioactive Source | Optimization Routine | U Mass (g) from A-ISOCS Analysis | Declared (expected) U Mass | A-ISOCS vs. Declared |
| Uranium Carbide 1 | Simplex | 738.8 ± 40.7 | ~800 | 0.923 |
| | Best Random Fit | 819.4 ± 31.0 | ~800 | 1.024 |
| Uranium Carbide 2 | Simplex | 982.3 ± 37.7 | ~900 | 1.091 |
| | Best Random Fit | 1069.1 ± 35.3 | ~900 | 1.188 |
| Uranium Carbide 3 | Simplex | 1643.5 ± 31.9 | 1606 | 1.023 |
| | Best Random Fit | 1636.5 ± 64.5 | 1606 | 1.019 |

RADIATION ANALYSIS SYSTEM AND METHOD

CROSS REFERENCE TO RELATED APPLICATIONS

This is a Continuation-in-Part (CIP) of U.S. patent application by Applicants Frazier Bronson and Valery Atrashkevich for "PROBABILISTIC UNCERTAINTY ESTIMATOR", Ser. No. 12/293,343, filed electronically with the USPTO on Mar. 19, 2007.

Applicants claim benefit pursuant to 35 U.S.C. §119 and hereby incorporate by reference Provisional patent application by Applicants Frazier Bronson and Valery Atrashkevich for "PROBABILISTIC UNCERTAINTY ESTIMATOR", Ser. No. 60/783,560, filed electronically with the USPTO on Mar. 17, 2006.

Applicants claim benefit pursuant to 35 U.S.C. §120 and hereby incorporate by reference Utility patent application by Applicants Frazier Bronson and Valery Atrashkevich for "PROBABILISTIC UNCERTAINTY ESTIMATOR", Ser. No. 12/293,343, filed electronically with the USPTO on Mar. 19, 2007. This application was a National Phase application of PCT Patent Application serial number PCT/US2007/006802 filed on Mar. 19, 2007.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention relates generally to radiation measurement techniques and systems/methods associated with optimizing efficiencies associated with these techniques. The present invention may be applied advantageously to the automated computation efficiencies of a quantitative radiation measurement coming from the calibration process when the calibration method is an imprecise representation of the actual sample measurement conditions. While not limitive of the invention teachings, the present invention may in some circumstances be advantageously applied to categories including U.S. Patent Classifications 438/14; 250/252.1; 250/363.09; 702/8; and 850/63.

PRIOR ART AND BACKGROUND OF THE INVENTION

Overview

The quantification of the amount of radioactivity measured by a radiation detector/sensor is not an exact process. There is always an uncertainty in the quantity that has been determined as "measured" by the radiation detector/sensor.

One contribution to the total uncertainty is commonly called "counting statistics" and arises from the fact that the measurement process counts discrete events that occur in a random manner from the decay of the radioactive atoms. The evaluation of the uncertainty from this process is well known and can be determined by mathematical techniques.

Another contribution to the total uncertainty is the uncertainty in the calibration factors. Calibration factors are necessary to relate the measured quantity to the quantity emitted from the radioactive source. Calibration factors are also referred to as interaction probabilities or detection efficiencies. These calibration factors may be determined by the measurement of well-known radioactive sources that have been prepared in a manner to closely mimic the unknown sample being measured. Alternatively, calibration factors can be determined by a mathematical process whereby the radiation physical parameters of the detector/sensor and the source/sample are defined, and the physics of radiation interaction with materials is defined, and where the probability of radiation from the sample interacting with the sensor is computed mathematically. One such example of mathematical computation method for efficiency calibration is described in the U.S. Pat. No. 6,228,664, issued on May 8, 2001 to Frazier Bronson and Valerii V. Atrashkevich for "CALIBRATION METHOD FOR RADIATION SPECTROSCOPY."

Once these calibration factors are determined, then either the source-based calibration factor or the mathematically computed calibration factor may be used to convert the measurement instrument output into a radioactivity quantity value for the sample being measured. There is always some amount of imprecision or uncertainty associated with the calibration factor, even if the radioactive calibration source or the mathematical calibration model perfectly represents the sample being measured. This is due to the random factors involved in the radioactive decay and measurement process. The method of computation of this portion of the uncertainty in the calibration factor is also well known.

If the sample being measured is exactly like the radioactive source used for the source-based calibration or the mathematical model used for the mathematical calibration, then the propagation of the counting statistics uncertainty and the calibration factor uncertainty are adequate to compute the total uncertainty of the measurement. But this condition is frequently not the case. There are many situations where the sample measurement conditions are different in a radiologically significant manner from those used or defined in the calibration process. Examples include but are not limited to:
  sample density variations;
  sample composition variations;
  sample non-uniformity;
  source-detector distance variations;
  sample container variations; and
  sample size variations.
Where these variations are known, they can be included in the calibration factor. But where they are not known or unpredictable then their effect can be limited by applying an efficiency optimization method. It is the automated efficiency optimization process, which is based on benchmarks derived from the measured data that is the subject of the present invention.

The traditional method of optimizing the efficiency curve includes an expert investigation of the measured data for consistency with the efficiency calibration. It is currently a manual process, which strongly relies on the expert judgment and requires multiple iterations. During the review process the expert can use different benchmarks to optimize the efficiency calibration. The benchmarks could be results from isotopic codes such as MGA, MGAU, or FRAM, activities from multi-line nuclides, and multiple counts of the same item taken in different geometries (from the side, bottom, top etc.). The manual optimization process is often very time consuming, which significantly limits the applicability of this method.

Prior Art System Context

In radiation measurement applications, efficiency calibration is commonly carried out by measuring a representative source standard or using a suitable mathematical method. In either case, certain simplifying assumptions are made with regards to the homogeneity of the sample matrix, the uniformity of radioactivity distribution, dimensions of sample, etc. However, there are many situations where the source dimensions, the matrix material and density, and the radioactivity distribution may not be well known. Under such circumstances, the efficiencies may not be very accurate since the calibration source geometry may not be very representative of the measured sample geometry.

The prior art teaches a modus operandi that manufactures a standard source or builds a mathematical model for efficiency calibration, using an educated guess with regards to the sample dimensions and homogeneity. These educated guesses are often simplifying assumptions that do not adequately represent the sample that may be encountered in the field. As a result, the activity results are assigned a large uncertainty in order to bound the conditions that make the sample different from the calibration standard.

The prior art implies that in order to lower the measurement uncertainty the user of a gamma-counting system can investigate possible discrepancies between an efficiency calibration and the actual conditions observed during sample measurement. This investigation process currently requires the user to be an expert in gamma-spectroscopy with enough knowledge and deep understanding of the physical principles associated with the gamma measurement. The scope of such analysis typically includes understanding of which geometry parameters might not be well known, isolating and investigating the effect of these individual parameter discrepancies on the efficiency calibration. When a sourceless (e.g., mathematical) efficiency calibration is used, the user can use spectral data and manually alter the efficiency calibration parameters to match the measured response.

Deficiencies in the Prior Art

While the prior art as detailed above can be used to optimize efficiency calibrations and reduce the overall measurement uncertainty, it suffers from the following deficiencies:
  Prior art requires an Expert to perform the analysis, i.e., most of the operators are typically not qualified to perform such investigation.
  Prior art relies almost solely on the Expert judgment and experience in interpreting measured data.
  Prior art is a manual process, which can require multiple iterations. This process is therefore often very time consuming and significantly limits the overall number of counts that can be processed by a counting system.
  In some cases, when there are many not-well-known geometry parameters, the prior art may be neither practical nor possible to properly execute to obtain a successful calibration result.

While some of the prior art may teach some solutions to several of these problems, the core issues of providing a system that permits automatic optimization of efficiencies to determine absolute activities and/or masses of radionuclides has not been addressed by the prior art.

OBJECTIVES OF THE INVENTION

Accordingly, the objectives of the present invention are (among others) to circumvent the deficiencies in the prior art and affect the following objectives:
  (1) provide for a radiation analysis system and method that permits automatic optimization of absolute efficiencies of a gamma ray detector for any source shape or size (based on the available data in the measurement(s));
  (2) provide for a radiation analysis system and method that permits nuclide identification and quantification based on the results of automatic optimizations of absolute efficiencies;
  (3) provide for a radiation analysis system and method that permits efficiency calibration to be performed without the need for reliance on imprecise assumptions;
  (4) provide for a radiation analysis system and method that permits the source/sensor calibration results obtained to be potentially more accurate than just using a static calibration;
  (5) provide for a radiation analysis system and method that provides for automatic efficiency optimization that is benchmarked to the data obtained from sample measurements;
  (6) provide for a radiation analysis system and method that permits a calibration method to be used to automatically optimize efficiencies at gamma ray energies from any radionuclide of interest in gamma spectrometry applications (special nuclear materials, activation products, fission products, etc.);
  (7) provide for a radiation analysis system and method that permits determination of the optimum value of the full energy peak efficiency at a gamma ray energy emitted by a radioactive source whose physical and radiological characteristics are not-well-known; and/or
  (8) provide for a radiation analysis system and method that permits efficiency calibrations to operate within the context of a fully automated personal computer (PC) platform.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

The present invention teaches an automated system/method to optimize full energy peak efficiencies. In this system/method, the NOT-WELL-KNOWN parameters are varied in an automated fashion and the optimal efficiency shape and magnitude are determined based on available benchmarks in the measured spectra. The benchmarks could be results from isotopic codes such as MGAU, MGA, or FRAM, activities from multi-line nuclides, and multiple counts of the same item taken in different geometries (from the side, bottom, top, etc.). The efficiency optimization is carried out using either a random search based on standard probability distributions, or using numerical techniques that carry out a more directed (smart) search. The optimized efficiencies, along with the associated uncertainties, are used in the analysis of the measured radiation spectrum from the given sample, and the activities or masses of radionuclides.

The present invention uses benchmarks available in the measured data to automatically optimize the calibration factor or efficiency of a radiation sensor for that portion of the uncertainty arising from imprecise knowledge of the exact measurement conditions. This is generally accomplished by the following:

- accurately defining a mathematical model of the sensor, the sample, and other items affecting the efficiency versus energy response of the measurement;
- defining the default or expected or normal dimensions or values of each of the parameters in the mathematical model;
- defining which of the values or parameters in the mathematical model are variables;
- for each variable parameter defining the range of variation and the shape of the distribution of those variable parameters;
- randomly selecting a value for each of the variable parameters in the model, using distribution shape and limits to create a mathematical model of one possible variation of source-detector measurement configuration;
- selecting optimization benchmark(s) available from the measured data;
- using this mathematical model and dimensions to compute the efficiency versus energy response of the defined source-detector measurement configuration;
- compute the Figure-of-Merit (FOM) for a given response, which determines quality of agreement with the measured benchmark(s);
- repeating this random selection process a number of times until a desired degree of statistical accuracy is obtained; and
- computing the mean and standard deviation of the "best" efficiency versus energy responses describing the uncertainty in that efficiency.

Within this context the present invention may also be embodied in a radiation analysis system/method that incorporates an optimization technique that obtains consistent results between spectroscopic measurements and dose measurements. In this alternate embodiment, the mathematical model is adjusted based on the available benchmarks in the spectral data and dose rate measurements using a non-spectroscopic detector such as a Geiger-Müller (GM) tube.

BRIEF DESCRIPTION OF THE DRAWINGS

For a fuller understanding of the advantages provided by the invention, reference should be made to the following detailed description together with the accompanying drawings wherein:

FIG. 18 illustrates an exemplary GUI used to input the initial geometry parameters and create a *.GIS data file;

FIG. 19 illustrates an exemplary ISOCS geometry data file exported by a typical geometry composer utility;

FIG. 26 illustrates known conditions for a Uranium 1 test item used in an application example of the present invention;

FIG. 27 illustrates known conditions for a Uranium 2 test item used in an application example of the present invention;

FIG. 28 illustrates known conditions for a Uranium 3 test item used in an application example of the present invention;

DESCRIPTION OF THE PRESENTLY PREFERRED EXEMPLARY EMBODIMENTS

Figure 1:
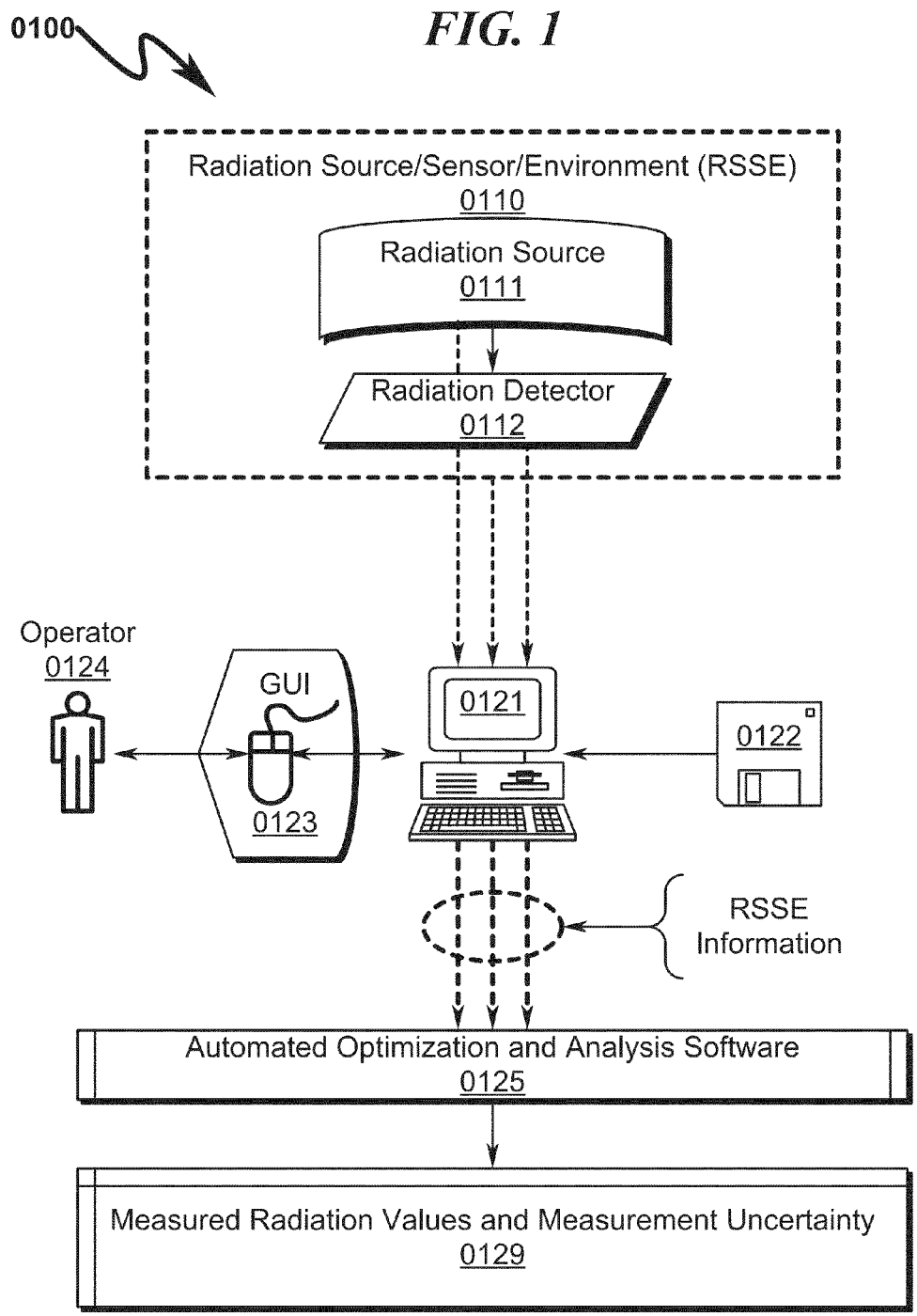
FIG. 1 illustrates an exemplary system application context in which the present invention is typically incorporated and depicts some of the basic components of a radiation measurement system.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a RADIATION ANALYSIS SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Radiation Type Not Limitive

While the present invention may be advantageously applied to the detection of gamma radiation in many preferred embodiments and contexts, it is not limited to this context. Therefore, specific applications of the present invention detailed herein with respect to gamma radiation should not be construed as limiting the invention to this particular type of measurement uncertainty estimation or model optimization.

Radiation Detector Not Limitive

As used herein, "radiation detector" means any spectroscopic radiation detector used or capable of use when conducting radiation analysis of radionuclides. This includes, but is not limited to, organic and inorganic scintillation detectors (NaI, LaBr, SrI, CsI, BGO, YSO, LSO, and the like), semi-conductor detectors (HPGe, CZT, PbI, PIN diodes, PIPS, surface barrier, and the like) as well as gaseous detectors (proportional counters) suitable for spectroscopy. Some embodiments of the present invention may make use of non-spectroscopic detectors such as Geiger-Müller (GM) tubes and the like to make dose rate measurements, and thus these types of radiation detectors are encompassed by the scope of the present invention. Moreover, "radiation detector" may also refer to combinations of the aforementioned detectors including hybrid systems of different component detector types.

Radiation Sample (RSAM) Not Limitive

The present invention may be applied to a wide variety of contexts and used in conjunction with the measurement of a wide variety of radiation types associated with a wide variety of radiation samples (RSAM). The RSAM group selections described below are only exemplary of those anticipated by the present invention.

Within this context, the RSAM in some preferred embodiments may be selected from a group consisting of Special Nuclear Materials (SNM) including radionuclides that belong to the Actinide series. Prominent among these are Uranium and Plutonium isotopes such as $^{235}$U, $^{238}$U, $^{239}$Pu, $^{238}$Pu and the like. The inventory of SNM is closely monitored by agencies such as the IAEA that ensure that countries around the world comply with nuclear safeguards.

The RSAM may also be selected from a group consisting of other radioactive nuclides that are not SNM. Prominent among them are the fission products and activation products such as $^{60}$Co, $^{152}$Eu, and the like. These nuclides are typically generated in nuclear reactor operations, and end up in radioactive waste generated by nuclear reactor operations.

Well-Known (WNP)/Not-Well-Known (NWP) Not Limitive

Within the context of the present invention the use of the terms "Well-Known parameters (WNP)" and "Not-Well-Known parameters (NWP)" should be given a broad definition consistent with general understanding of standard statistical terms. In the context of the present invention, and in the general understanding of statistics, NWP are those parameters that are not known to an acceptably high degree of precision. They are known to exist within some range of values (the upper and lower limits), but not known exactly where within those limits. In contrast, WNP are parameters that are also technically not perfectly well known (nothing is) but when considered within the context of the full model, are known precisely enough that any variation on those values is overwhelmed by the variation in the NWP.

Synonyms Equivalent

Within the context of the present invention, the terms "source"/"sample" are considered synonyms for a radiation source and the terms "detector"/"sensor" are considered synonyms for a radiation detection device.

Peak Area Detector Not Limitive

While the present invention anticipates that peak area detection may be accomplished by a wide variety of instruments and/or techniques, many preferred embodiments utilize Canberra Industries, Inc. (800 Research Parkway, Meriden, Conn. 06450, U.S.A) Model Genie2000™ Basic Spectroscopy Software and/or Gamma Analysis Software (Genie2K) and associated instruments to perform this function. However, while preferred, the present invention is not limited to this particular instrument in this functional role.

ISOCS Not Limitive

While the present invention anticipates that In Situ Object Counting System (ISOCS) calibration software may be used in many preferred embodiments of the present invention, the present invention scope is not limited to these configurations or this specific software or the use of the specific A-ISOCS variant of this calibration software. Within the context of the present invention disclosure, the terms "ISOCS" and "A-ISOCS" are used interchangeably.

Geometry Information Setup (GIS) Not Limitive

While the present invention anticipates the use of a Geometry Information Setup (GIS) file within the context of determining setup dimensions and measurements associated with a particular setup, the GIS files and their associated content and format presented herein are only exemplary of the general concept. Thus, the term "GIS" and its associated information should be given its broadest possible interpretation within this disclosure and does not limit the scope of the present invention to this particular structure.

Statistical Mean/Standard Deviation Not Limitive

While the present invention anticipates that a variety of statistical functions may be used to determine particular calibration/measured value results and uncertainties, many preferred embodiments utilize statistical mean and standard deviation to perform these functions respectively. However, the use of a particular mean (arithmetic or geometric) and/or a standard deviation (arithmetic or geometric) are not limitive of the invention scope. Within this context, the present invention is not limited in scope to a particular type of mean or standard deviation calculation form.

General System Description

The present invention in many preferred embodiments accomplishes the objectives mentioned previously by implementing the following:
 a system/method of accurately defining a mathematical model of the sensor, the sample, and other items affecting the efficiency;
 a system/method of defining the default or estimated or nominal dimensions or values of each of the parameters in the mathematical model;
 a system/method of defining which of the values or parameters in the mathematical model are variables;
 a system/method of defining the range of variation of each of the variables in the model;
 a system/method of either assuming a particular shape of the variation within the defined range, or a system/method of allowing the user to define a particular shape of the distribution within the defined range;
 a system/method of randomly selecting a value for each of the variable parameters in the model, using either the assumed distribution shape, or the user-defined distribution shape to create a mathematical model of one possible variation of source-detector measurement configuration;
 a system/method for selecting one or more optimization benchmarks available from the measured data;
 a system/method of using this mathematical model and dimensions to compute the calibration factor for the defined source-detector measurement configuration;
 a system/method for defining and computing a Figure-of-Merit (FOM) that is used for selecting the "best" calibration factor;
 a system/method to repeat this random selection process a statistically accurate number of times; and
 a system/method to then compute the mean or average value of the calibration factor among the best calibration factors selected based on the optimization results, and statistical parameters describing the uncertainty in that calibration factor.

The previously detailed methods may all utilize the mathematical model to compute the calibration factor for each of several energies, in order to evaluate the calibration factor and the uncertainty in the calibration factor versus energy response of the measurement apparatus.

Exemplary Application Context Overview

In gamma spectrometry applications, efficiency calibration is commonly carried out by measuring a representative source standard or using a suitable mathematical method. In either case, certain simplifying assumptions are made with regards to the homogeneity of the sample matrix, the uniformity of radioactivity distribution, dimensions of sample, etc. However, there are many situations where the source dimensions, the matrix material and density, and the radioactivity distribution are not-well-known. Under such circumstances, the efficiencies may not be very accurate since the calibration source geometry may not be very representative of the measured sample geometry.

The present invention teaches an automated system/method to optimize full energy peak efficiencies. In this system/method, the NOT-WELL-KNOWN parameters are varied in an automated fashion and the optimal efficiency shape and magnitude are determined based on available benchmarks in the measured spectra. The benchmarks could be results from isotopic codes such as MGAU, MGA, or FRAM, activities from multi-line nuclides, and multiple counts of the same item taken in different geometries (from the side, bottom, top, etc.). The efficiency optimization is carried out using either a random search based on standard probability distributions, or using numerical techniques that carry out a more directed (smart) search. The optimized efficiencies, along with the associated uncertainties, are used in the analysis of a radiation (gamma ray, etc.) spectrum from the given sample, and the activities or masses of radionuclides.

System/Method Context Overview (0100)

A typical application context for the present invention is generally illustrated in FIG. 1 (0100), wherein the present invention is utilized in a radiation measurement context comprising a radiation source/sensor/environment (RSSE) (0110) further comprising a radiation source (0111), radiation detector (0112) and associated environmental conditions. This RSSE (0110) interfaces to a computer system (0121) typically controlled by computer software read from a computer readable medium (0122). This computer software (0122) typically incorporates a graphical user interface (GUI) (0123) that permits an operator (0124) to monitor and/or control the RSSE (0110) computer controlled interface. Within this overall hardware/software context, automated calibration software (0125) operates to enable measurements from the RSSE (0110) to be calibrated to known standards and produce measured radiation values and measurement uncertainty values (0129). The focus of the present invention is the automated calibration software (0125) that permits both a calibrated measurement from the RSSE (0110) to be obtained, but also an estimate of the uncertainty of this calibrated measurement.

Typical Application Context (0200)

Figure 2:
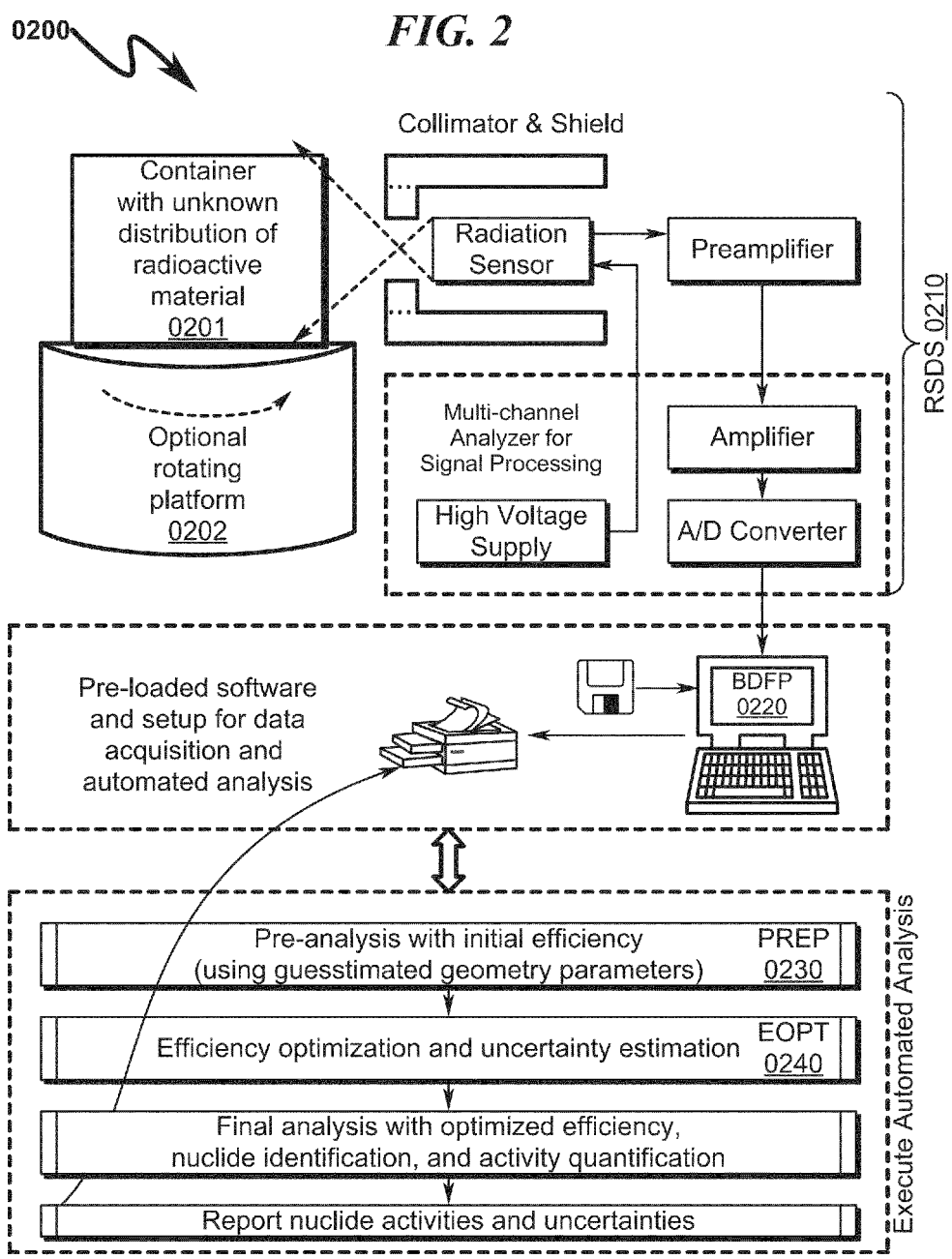
FIG. 2 illustrates an exemplary system block diagram of a preferred embodiment of the present invention depicting a typical invention application setup context.

While the present invention may be implemented in a variety of application contexts, a typical example is illustrated in FIG. 2 (0200) wherein a container with unknown distribution of radioactive material (0201) is to be characterized in terms of absolute efficiencies, nuclide identification, and radionuclide mass determination. Within this context the system utilizes a radiation source detection subsystem (RSDS) (0210) typically comprising a radiation sensor, high voltage supply, collimator/shield, preamplifier, amplifier, and A/D converter to collect digital radiation detection values (DRDV) that are then processed by a batch definition processor (BDFP) (0220) running automated analysis software.

The analysis system utilizes a pre-analysis processor (0230) to perform a preliminary analysis of the DRDV data and define an efficiency estimate for the radiation sample. This is followed by an efficiency optimization processor (EOPT) (0240) that generates absolute efficiency values for the radiation sample using the efficiency estimate as a starting point and operating based on constraints and data provided by the batch definition processor (0220). This optimization process utilizes models comprising WELL-KNOWN-PARAMETERS (WNP) that are typically fixed and NOT-WELL-KNOWN-PARAMETERS (NWP) that are adjusted to correspond to the measured radiation data. Once the absolute efficiencies have been optimized, a post-analysis processor (POST) (0250) is activated to perform post-optimization processing of the data and generate reports of the absolute efficiencies, nuclide identification, and radionuclide mass or activity determinations.

System/Method Calibration Factor Overview (0300)

Figure 3:
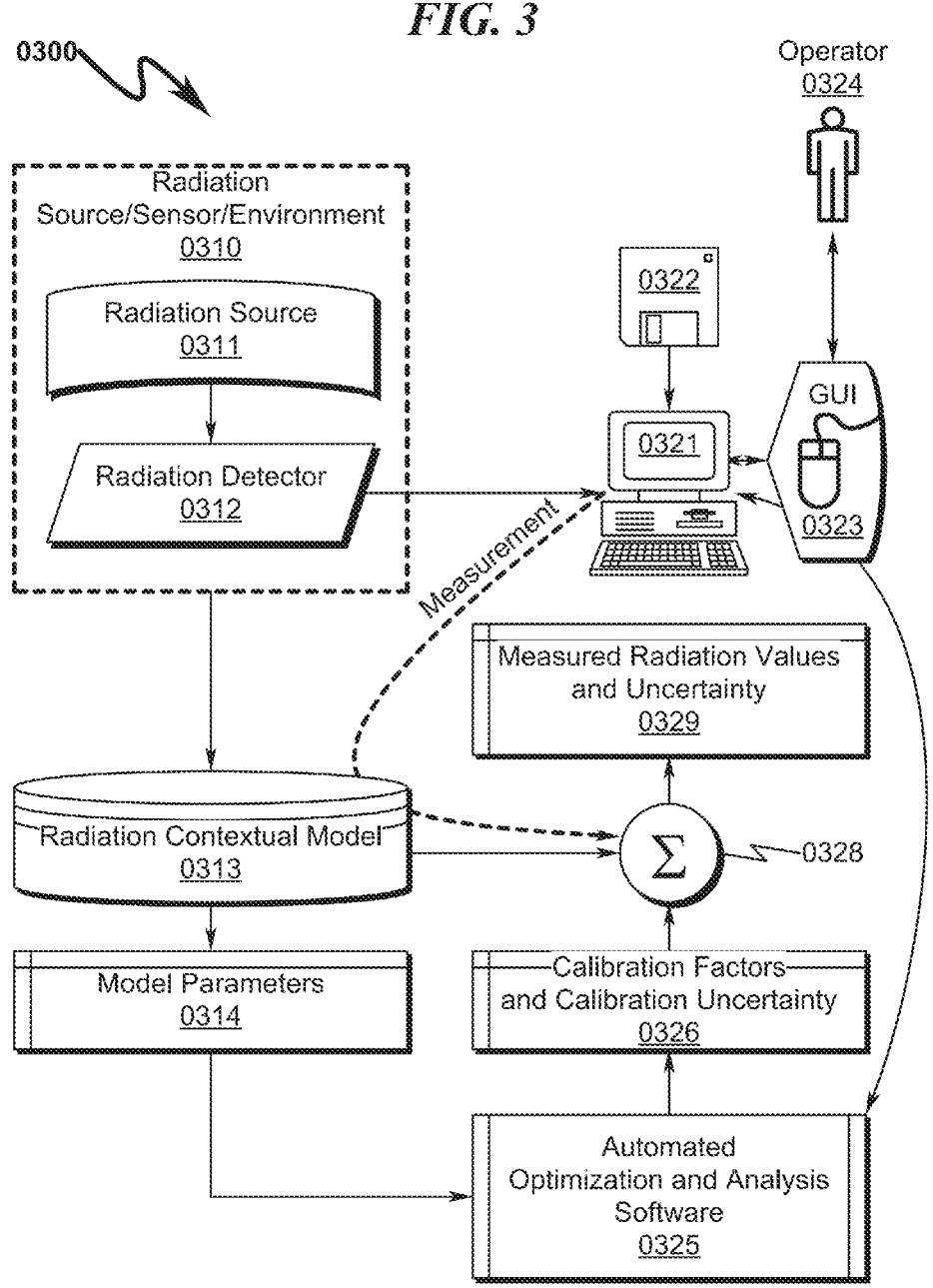
FIG. 3 illustrates an exemplary system block detail diagram of a preferred embodiment of the present invention.

A typical implementation for the present invention is generally illustrated in FIG. 3 (0300), wherein the present invention is utilized in a radiation measurement context comprising a radiation source/sensor/environment (RSSE) (0310) further comprising a radiation source (0311), radiation detector (0312) and associated environmental conditions. This RSSE (0310) interfaces to a computer system (0321) typically controlled by computer software read from a computer readable medium (0322). This computer software (0322) typically incorporates a graphical user interface (GUI) (0323) that permits an operator (0324) to monitor and/or control the RSSE (0310) computer controlled interface. Within this overall hardware/software context, contextual models (0313) describing the RSSE (0310) have associated with them model parameters (0314) that may vary based on source/sensor/environment (RSSE) (0310) configurations. The automated optimization software (0325) makes a selection of model parameters (0314) for the radiation contextual model (0313) to define a model set describing the RSSE (0310). This model set is then used to calculate a set of calibration factors for the model and their associated calibration uncertainty values (0326).

The radiation contextual model (0313) is integrated (0328) with the calculated calibration factors/calibration uncertainty values (0326) within the context of a radiation measurement to produce a measured radiation value and associated uncertainty. The automated optimization software (0325) operates in conjunction with the RSSE (0310) and the computer system (0321) to enable measurements from the RSSE (0310) to be customized to the given sample and produce the measured radiation values and measurement uncertainty values (0329). The focus of the present invention is the automated optimization software (0325) that permits contextual models (0313) describing the RSSE (0110) to be directly applied to measurements obtained from the RSSE (0310) to obtain a measurement value and its associated uncertainty.

System/Method KNOWN/NOT-WELL-KNOWN Overview (0400)

Figure 4:
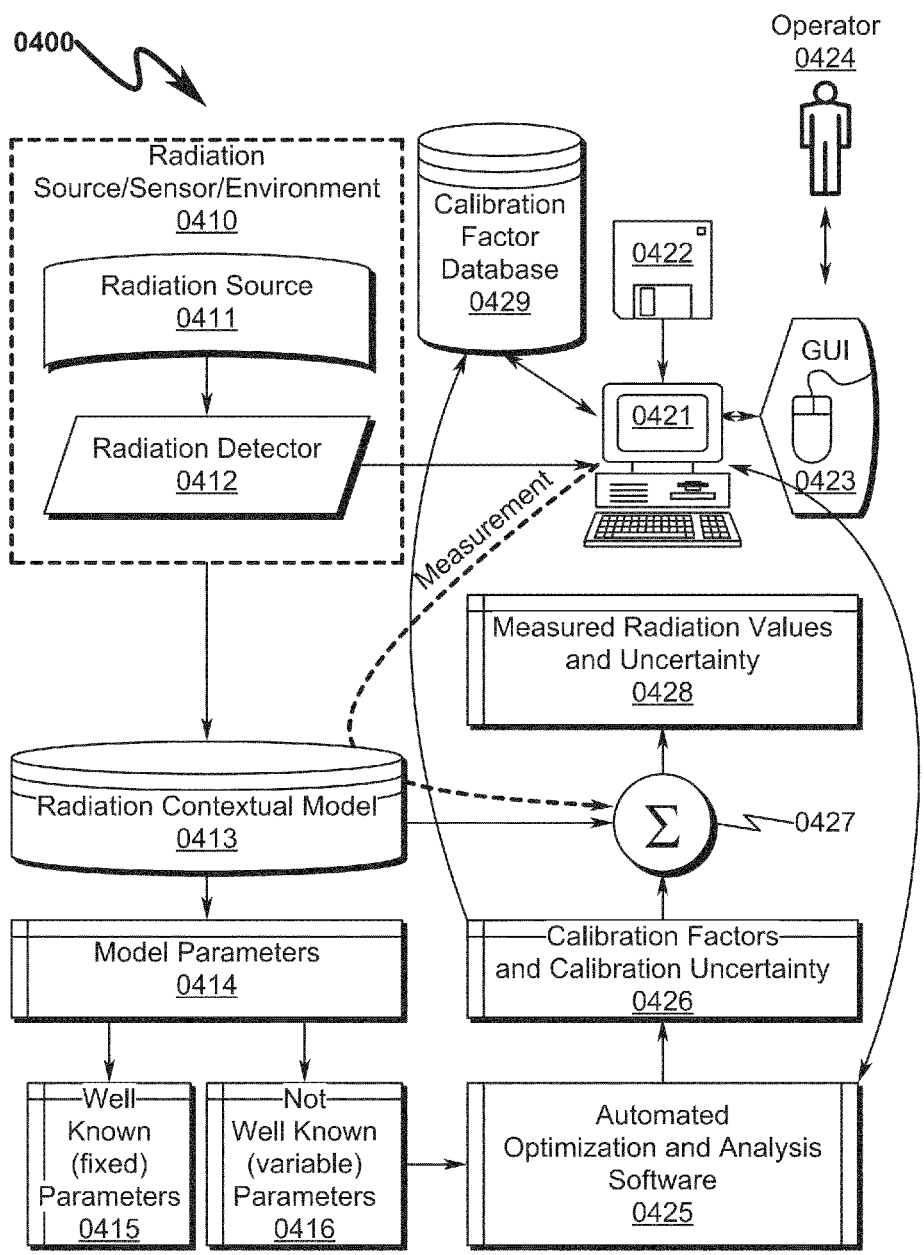
FIG. 4 illustrates an exemplary system block detail diagram of a preferred embodiment of the present invention incorporating the use of model parameters that are WELL-KNOWN (WNP) and NOT-WELL-KNOWN (NWP)

The present invention generally augments the overview structure detailed in in FIG. 3 (0300) with additional features as is generally depicted in FIG. 4 (0400), wherein the model parameters (0414) incorporate WELL-KNOWN (fixed) parameters (0415) and NOT-WELL-KNOWN (variable) parameters (0416). The NOT-WELL-KNOWN (variable) parameters (0416) are modified by the automated optimization software (0425) in a random statistical fashion and used to generate calibration factors and associated calibration factor uncertainties (0426) that are stored in a database (0429) for later integration with the radiation contextual model (0413) and actual radiation measurement data. All of these functions operate within the context of a stored computer program executing on a computer system (0421) running software read from a computer readable medium (0422). Within this system context, each of the major system components may have associated with it computer control systems running a variety of computer application programs and/or software that is retrieved from a computer usable medium (0422) having computer-readable program code means. The present invention does not limit the type of physical media on which this software may reside.

System/Method Parameter Search Techniques Overview (0500)

Figure 5:
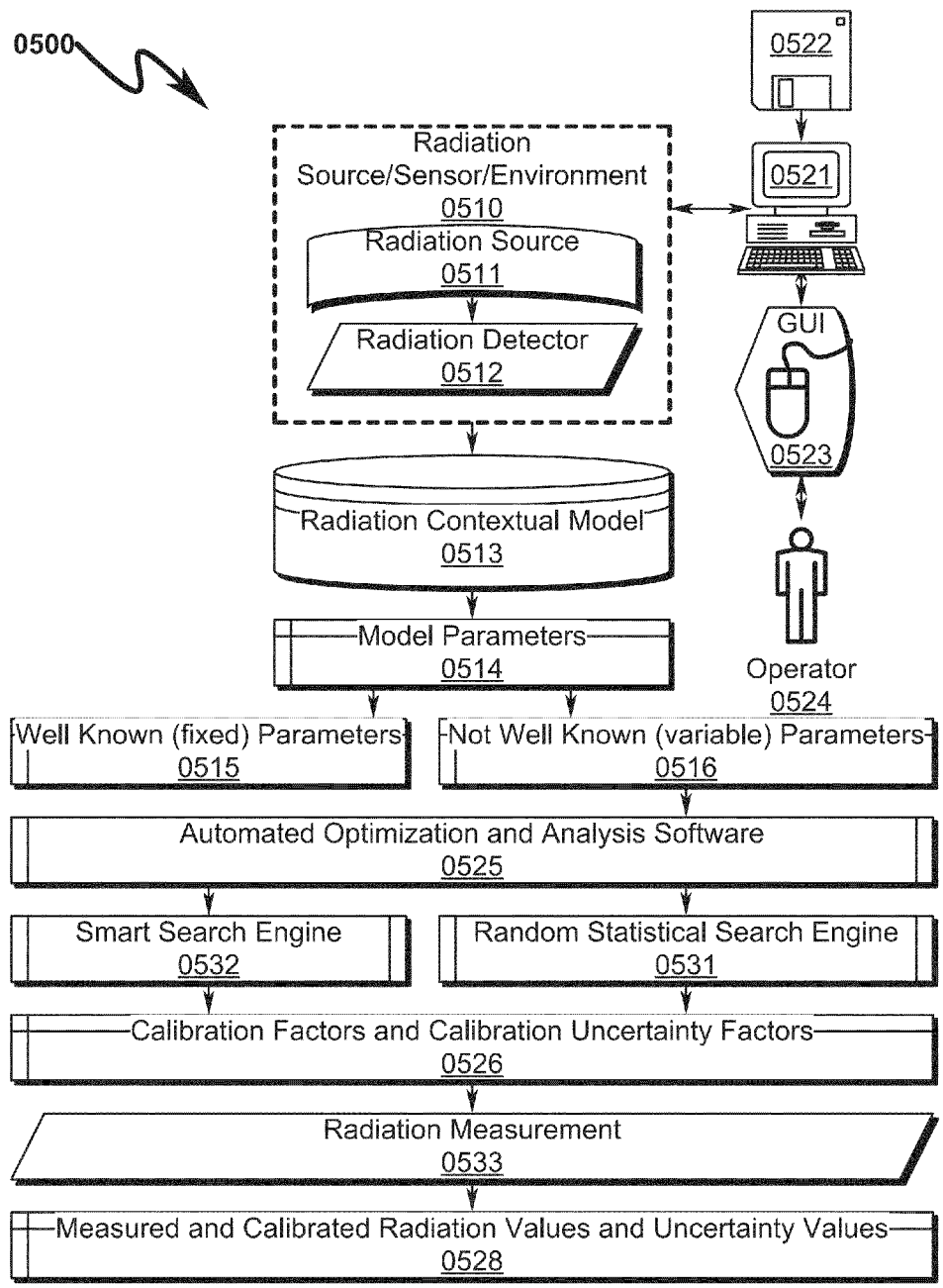
FIG. 5 illustrates an exemplary system block detail diagram of a preferred embodiment of the present invention incorporating smart parameter searching as well as random statistical parameter searching.

The present invention generally may utilize a variety of methods to determine the value of NOT-WELL-KNOWN calibration parameters as generally detailed in FIG. 5 (0500). Here it can be seen that the overall processing of NOT-WELL-KNOWN parameters (0516) as a function of overall model parameters (0514) by the automated calibration software (0525) can be handled via the use of a "smart" search engine (0532) or a random statistical search engine (0531). Either of these engines can determine calibration factors and their uncertainty factors (0526) which when used in the context of a radiation measurement (0533) produce measured and calibrated radiation values and associated uncertainty values (0528).

Automated Optimization

The automated optimization process described in this patent application may be used with dose rate measurement data as benchmarks. When dose rate data is used, the flow of the optimization process is identical to the process flow when spectroscopy detector data is used. The optimization may be performed using dose rate data only, or the dose rate data may be used in combination with the spectroscopy data. Details of two exemplary implementation methodologies for these processes are described below.

Optimization Using Dose Rate Measurement Data Only (0600)

Figure 6:
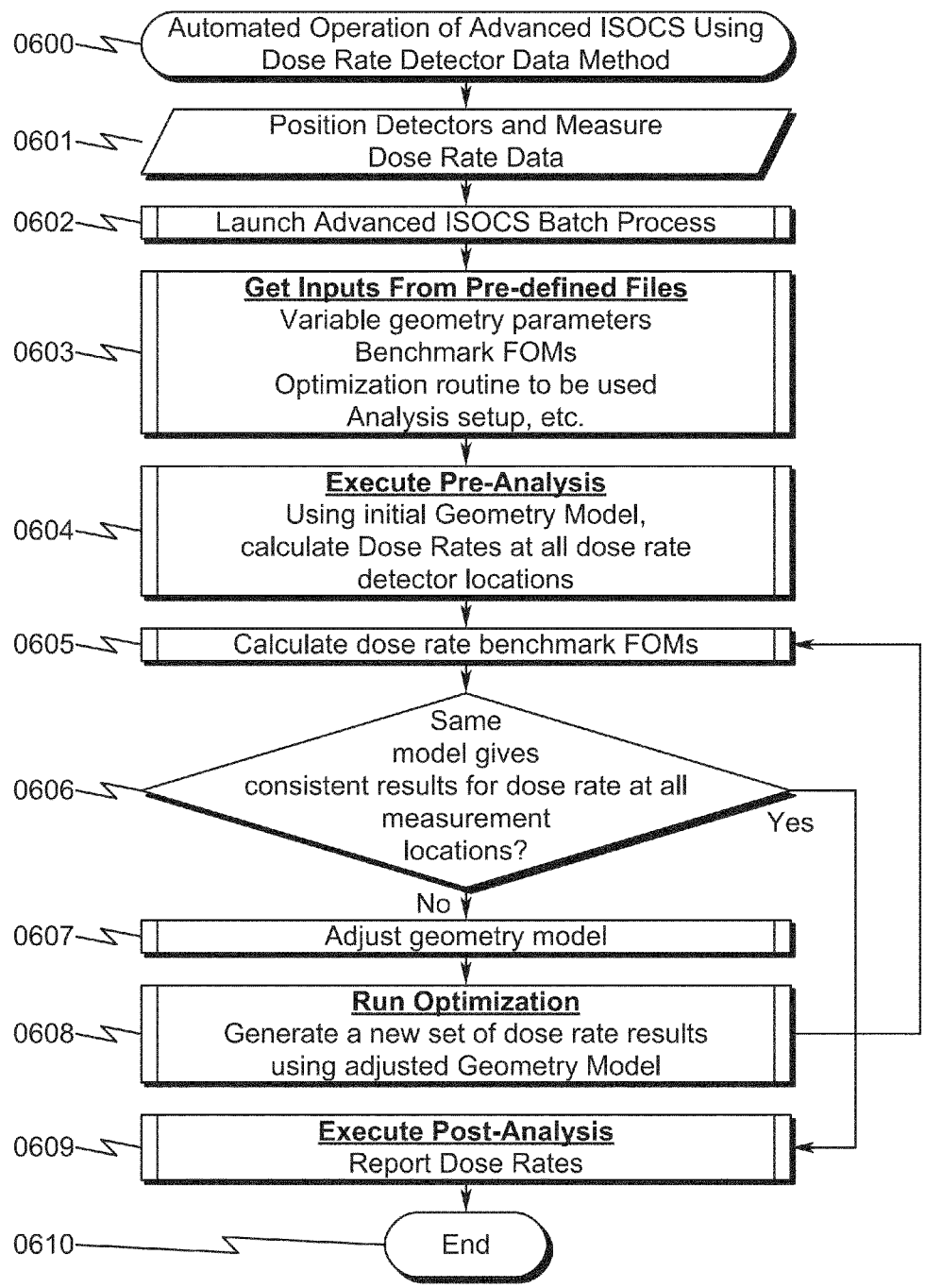
FIG. 6 illustrates an exemplary method detail flowchart of a preferred method embodiment of the present invention implementing an automated operation of advanced ISOCS using dose rate detector data only.

The present invention system described above may be utilized in conjunction with a method providing for optimization using dose rate measurement data only as generally described in the flowchart illustrated in FIG. 6 (0600). The steps in this general radiation analysis method generally comprise:

(1) Locate a set of dose rate detectors at various pre-selected measurement geometry locations with respect to a radioactive item. Record the dose rate data at the pre-selected locations. Transfer the dose rate data to a computer. (0601)
(2) Launch the A-ISOCS automated optimization process from the computer. (0602)
(3) Read the Initial Geometry Parameters file. Get inputs from pre-defined files: variable geometry parameters, Benchmark FOMs, Optimization Routine to be used, etc. (0603)
(4) Using the initial geometry model, calculate dose rates at all dose rate detector locations. (0604)
(5) Determine the ratios of calculated to measured dose rates at all dose rate locations. Compute the FOM. An appropriate FOM can be defined. For example, the product sum of the ratios of calculated to measured dose rates at the various dose rate detector locations. (0605)

$$FOM_{Doserate} = \prod_i \left( \frac{D^i_{Calc}}{D^i_{Meas}} \right)$$

(6) Determine if the same model gives consistent results for dose rates at all measurement locations, and if so, proceed to step (9). (0606)
(7) Vary the variable geometry parameters using the Best Random Fit Routine or the Smart Routine. (0607)
(8) For each model or iteration, calculate the dose rate results and the benchmark FOM by proceeding to step (5). (0608)
(9) The optimum geometry model is the one that gives the best FOM. For example, if the product sum of the ratios of calculated to measured dose rates is chosen as the FOM, the "best" value of the FOM will be the one closest to unity. Report optimized dose rates. (0609)
(10) Once the optimization of the geometry model of the radiation source is accomplished, reliable dose rate values can be calculated at any location with respect to the source. This can be a real advantage since it will help in minimizing the number of measurements to be done by human beings, thus reducing the radiation exposure to personnel, as well as the cost of the measurement campaign. (0610)

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Optimization Using Dose Rate & Spectroscopy Data (0700)

Figure 7:
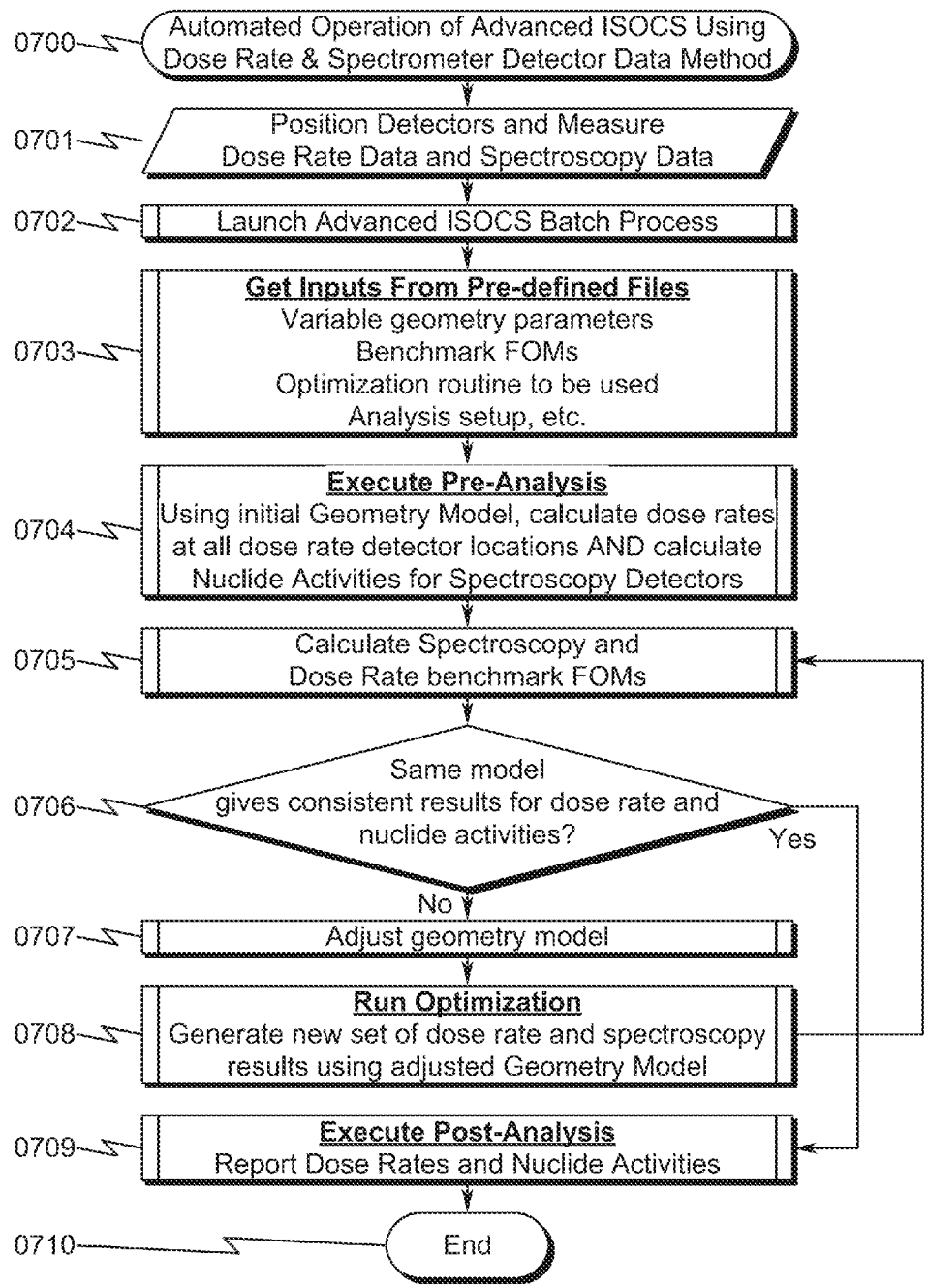
FIG. 7 illustrates an exemplary method detail flowchart of a preferred method embodiment of the present invention implementing an automated operation of advanced ISOCS using dose rate detector data and spectrometer data.

The present invention system described above may be utilized in conjunction with a method providing for optimization using dose rate measurement data and spectroscopy measurement data as generally described in the flowchart illustrated in FIG. 7 (0700). The steps in this general radiation analysis method generally comprise:

(1) Locate a set of dose rate detectors and one or more spectroscopy detectors at various pre-selected measurement geometry locations with respect to a radioactive item. Record the dose rate data and spectroscopy data at the pre-selected locations. Transfer the dose rate/spectroscopy data to a computer. (0701)
(2) Launch the A-ISOCS automated optimization process from the computer. (0702)
(3) Read the Initial Geometry Parameters file. Get inputs from pre-defined files: variable geometry parameters, Benchmark FOMs, Optimization Routine to be used, etc. (0703)
(4) Using the initial geometry model, calculate dose rates at all dose rate detector locations and nuclide activities for spectroscopy detectors. (0704)
(5) Compute the Spectroscopy benchmark FOM using one of the methods described in OPTIMIZATINO BENCHMARKS below. Determine the ratios of calculated to measured dose rates at all dose rate locations. Compute the dose rate FOM. An appropriate dose rate FOM can be defined. For example, the product sum of the ratios of calculated to measured dose rates at the various dose rate detector locations. (0705)

$$FOM_{Doserate} = \prod_i \left( \frac{D^i_{Calc}}{D^i_{Meas}} \right)$$

(6) Determine if the same model gives consistent results for dose rates and nuclide activities at all measurement locations, and if so, proceed to step (9). (0706)
(7) Vary the variable geometry parameters using the Best Random Fit Routine or the Smart Routine. (0707)
(8) For each model or iteration, calculate the dose rate results and the benchmark FOM and Spectroscopy benchmark FOM by proceeding to step (5). (0708)
(9) The optimum geometry model is the one that gives consistent results with the dose rate detector and spectroscopy detector measurements. Report optimized dose rates. (0709)
(10) Once the optimization of the geometry model of the radiation source is accomplished, reliable measurement values can be calculated at any location with respect to the source. This can be a real advantage since it will help in minimizing the number of measurements to be done by human beings, thus reducing the radiation exposure to personnel, as well as the cost of the measurement campaign. (0710)

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

General Method Overview (0800)

Figure 8:
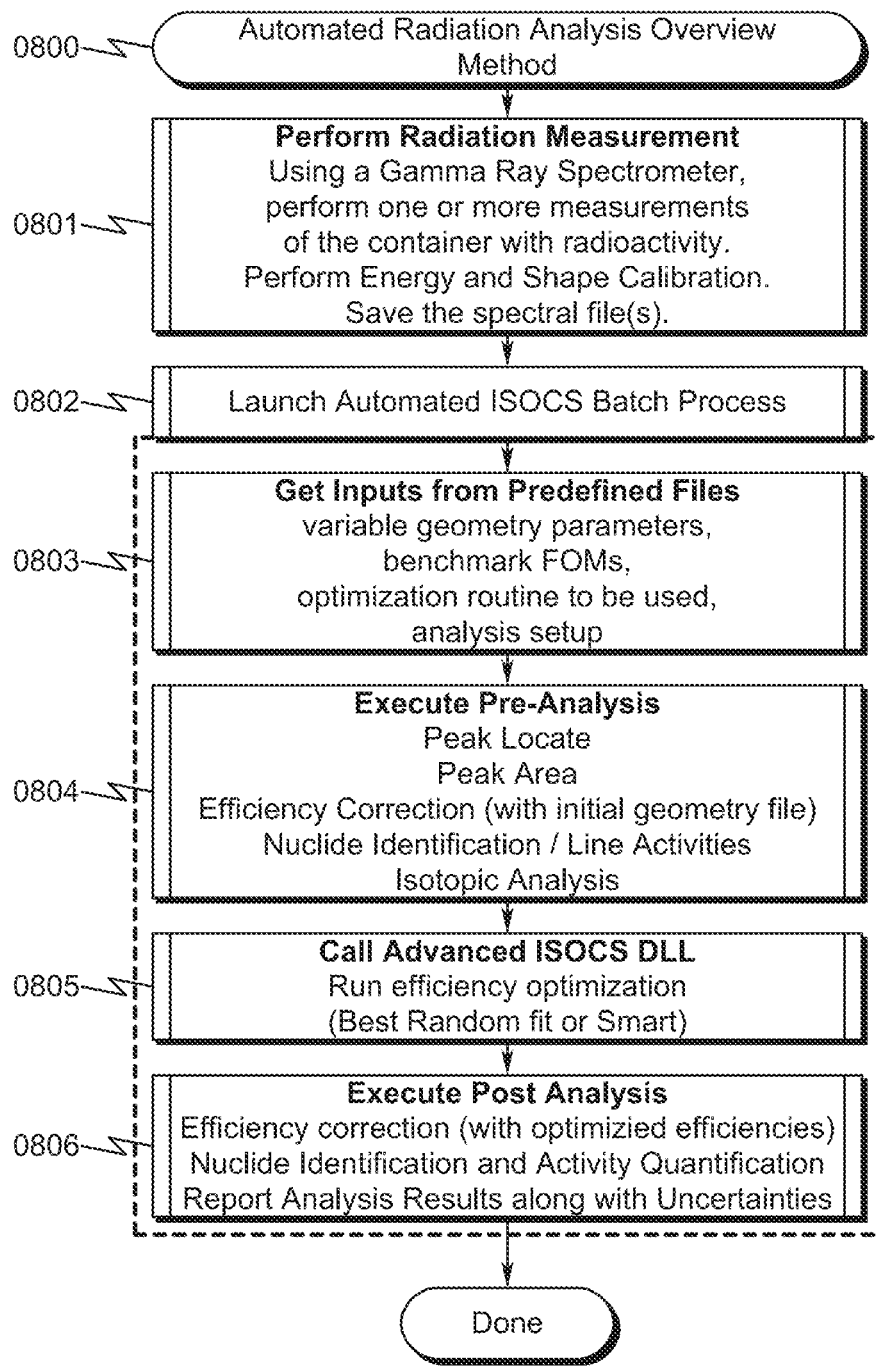
FIG. 8 illustrates an exemplary method overview flowchart of a preferred embodiment of the present invention implementing an exemplary radiation analysis method.

The present invention system described above may be utilized in conjunction with a method as generally described in the flowchart illustrated in FIG. 8 (0800). The steps in this general radiation analysis method generally comprise:
(1) Perform A Radiation Measurement. Using a gamma ray spectrometer (and/or a non-spectroscopic radiation detector), performing one or more measurements of the container with radioactivity and then performing energy and shape calibration, subsequently saving the spectral files. (0801);
(2) Launch an automated ISOCS batch process to automatically optimize absolute efficiencies and determine nuclide identification and radionuclide masses (0802);
(3) Get inputs from predefined files (or a GUI) to define variable geometry parameters, benchmark Figures of Merit (FOMs), optimization routines to be used, and analysis setup (0803);
(4) Execute pre-analysis to locate gamma ray peaks, calculate peak areas, efficiency corrections, nuclide identifications/line activities, and isotopic analysis (0804);
(5) Execute advanced ISOCS to run efficiency optimization using Best Random Fit or Smart Routine (0805);
(6) Execute post-analysis processing to determine efficiency corrections (with optimized efficiencies), nuclide identifications, and activity quantification, reporting these results along with measurement uncertainties (0806).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention. As indicated above, the automated model optimization taught by the present invention may also be applied to automatically adjust the mathematical model to determine radiation dose. This may provide a consistency check between the radiation dose result and the activity results from spectroscopy measurements.

Automated Process Flow (0900-1500)

Setup File Configuration

Before launching the automated efficiency optimization process, the user will typically configure one or more setup files to be used by the analysis process. One skilled in the art will recognize that these files may take many forms and include a wide variety of information. A preferred exemplary embodiment of the present invention may make use of the following exemplary set of files and their contents as follows:
The *.GIS file with initial values of geometry parameters;
The IUE project file consisting of information on variable parameters in the model, their ranges of variation, the benchmark FOMs to be used in the optimization process, the type of optimization routine (Best Random Fit or one of the Smart routines) along with its setup parameters;
The Genie2K Pre-Analysis Sequence File definition: This includes the steps of Peak Locate, Peak Area, Applying Initial Efficiency (using initial model), Initial Nuclide Identification, MGA/MGAU isotopic analysis (for U/Pu items); and
The Genie2K Post-Analysis Sequence File definition: This includes the steps of Efficiency Optimization step, Applying optimized Efficiency, Final Nuclide Identification and quantification, Reporting nuclide activities and uncertainties. One skilled in the art will recognize that this exemplary file complement in no way limits the scope of the present invention.

Automated Efficiency Optimization Steps

Figure 9:
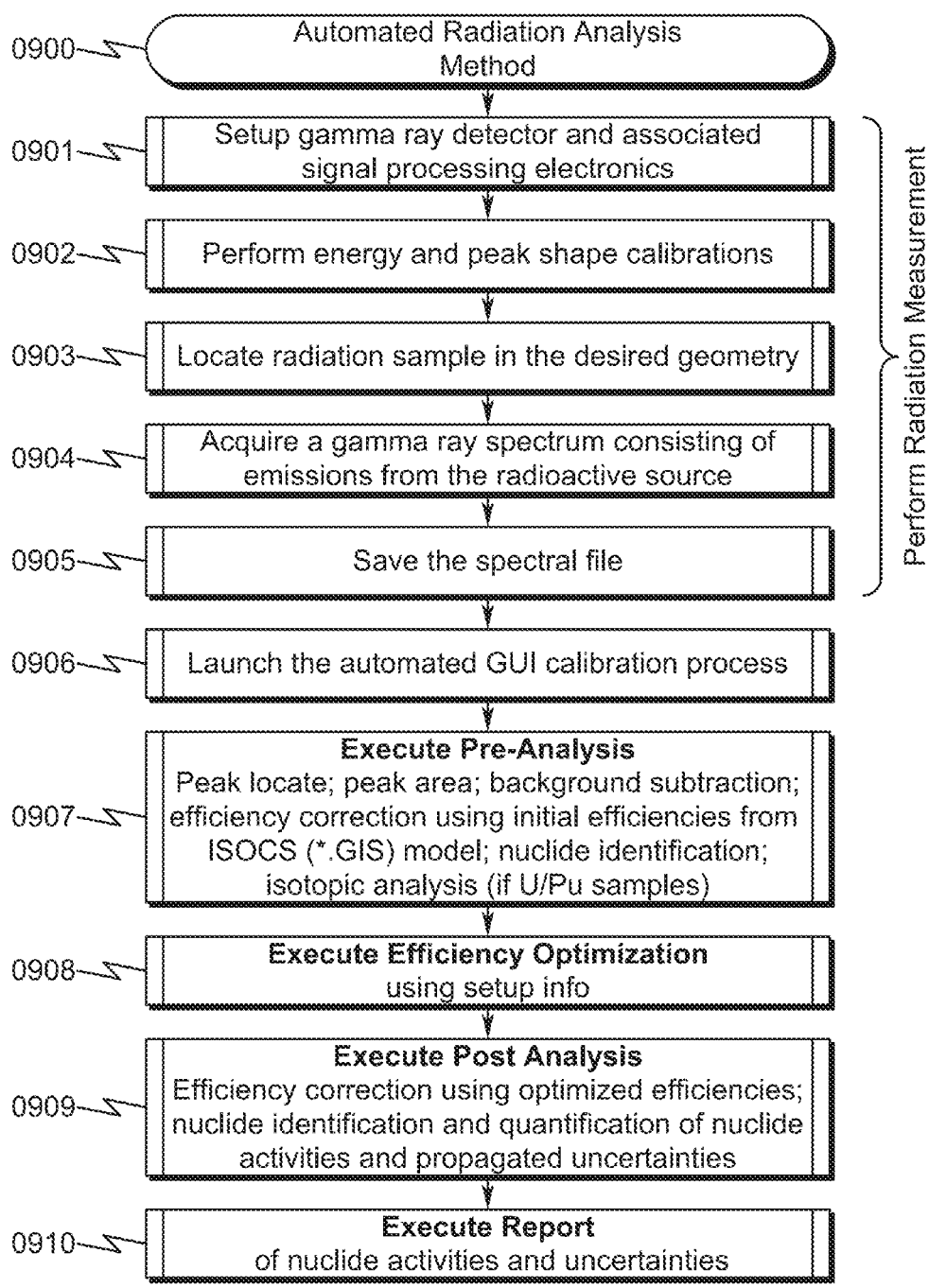
FIG. 9 illustrates an exemplary method detail flowchart of a preferred embodiment of the present invention implementing an exemplary radiation analysis method.
Figure 10:
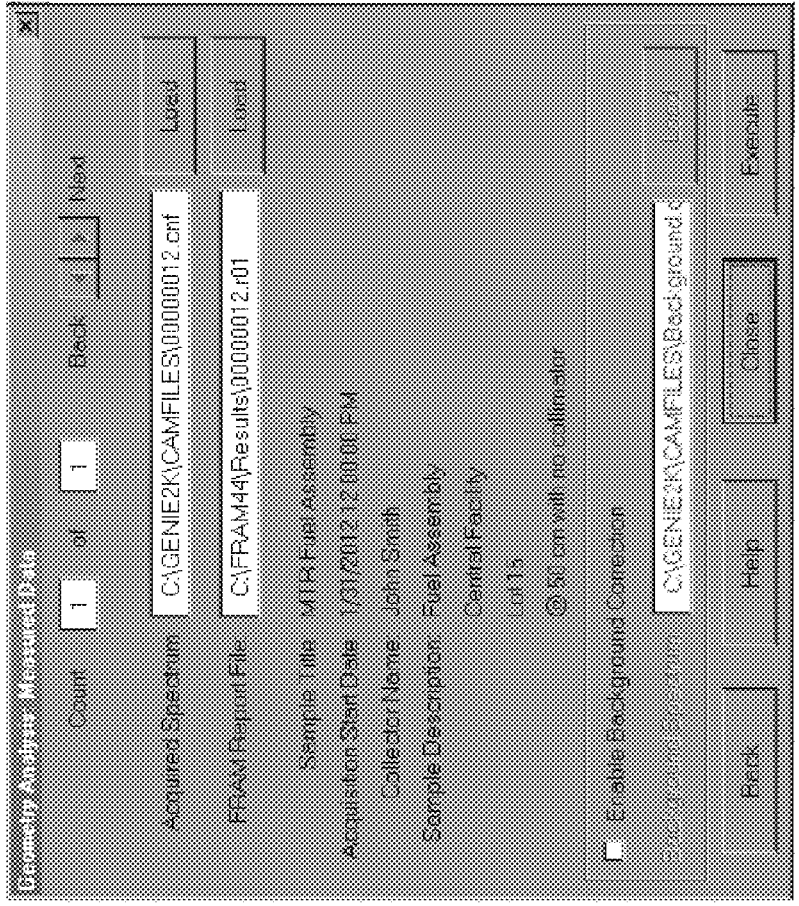
FIG. 10 illustrates an exemplary GUI dialog used to execute the automated optimization and analysis routines described herein.

As generally illustrated in FIG. 9 (0900), the automated process to optimize the efficiencies and analyze the gamma ray spectra will be executed in the following steps:
(1) The user will setup the gamma ray detector and the associated signal processing electronics (RSDS). The signal processor is connected to the system PC. Installed on the system PC is the software that will acquire the gamma spectra and will run the automated analysis. The user will also collimate and shield the detector as needed by the particular measurement scenario. (0901)
(2) The user will perform energy calibration and peak shape calibration (also called Full Width at Half Maximum calibration). (0902)
(3) The user will locate the item containing the radioactive material in the desired geometry. Note that the distance and orientation of the radioactive source item in the initial Geometry Information Setup (GIS) file must correspond to the actual measurement setup. (0903)
(4) The user will acquire a gamma ray spectrum consisting of emissions from the radioactive source for a period of time appropriate for obtaining the desired statistical precision in the data. (0904)
(5) The user will save the spectral file. (0905)
(6) The user will then launch the automated process (BDFP) via a GUI interface as generally illustrated in FIG. 10 (1000). The automated process executes the following steps (7)-(10) in sequence. (0906)
(7) Execute Pre-Analysis (PREP); Peak Locate, Peak Area, Background Subtraction, Efficiency Correction using initial efficiencies from initial ISOCS (*.GIS) model, Nuclide Identification, isotopic analysis (if U/Pu samples). (0907)
(8) Execute Efficiency Optimization (EOPT) using the setup information available in the IUE Project file. (0908)
(9) Execute Post-Analysis (POST): Efficiency Correction using optimized efficiencies, Nuclide Identification and Quantification of nuclide activities and propagated uncertainties. (0909)
(10) Report nuclide activities and uncertainties. (0910)

Figure 11:
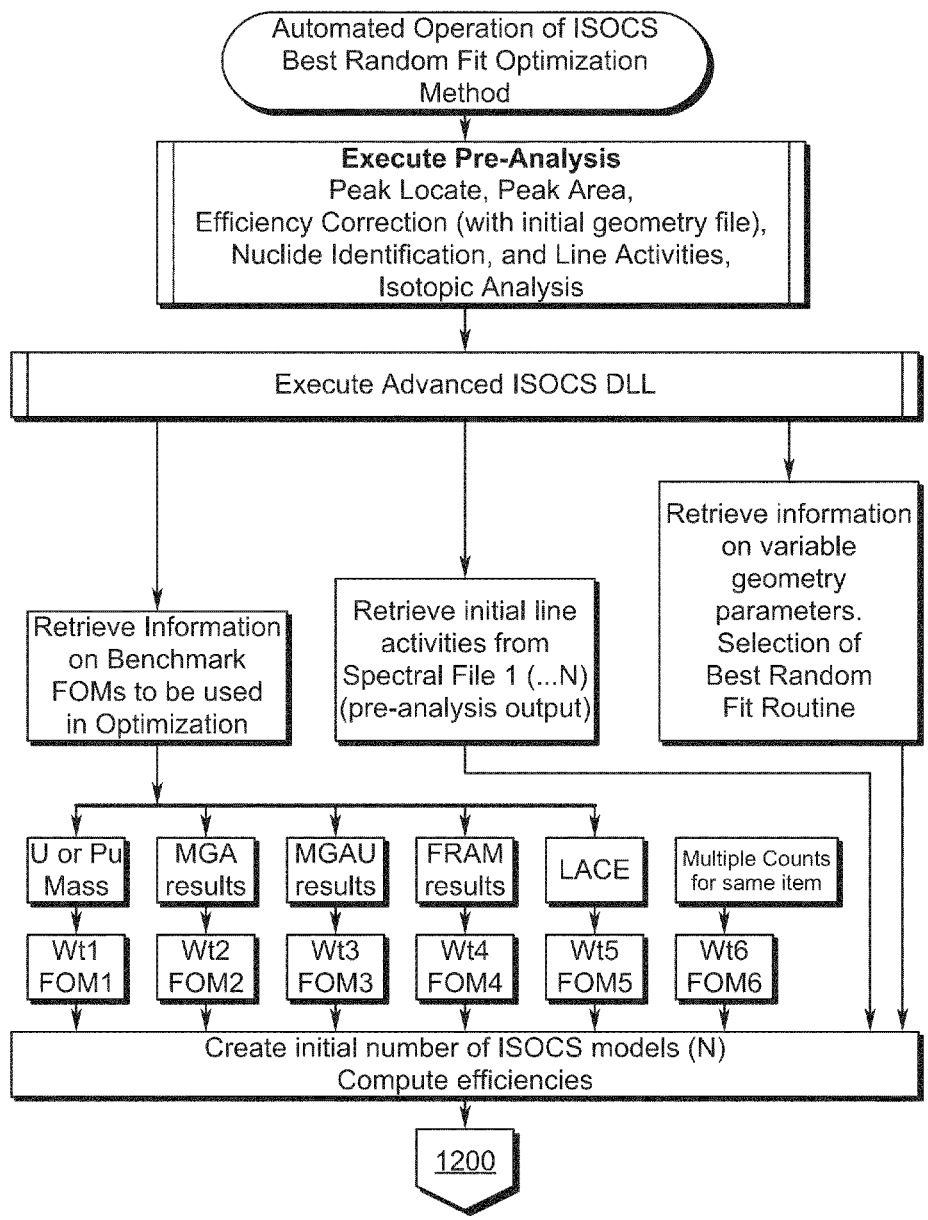
FIG. 11 illustrates an exemplary method flowchart of a preferred embodiment of the present invention implementing an exemplary automated best random fit efficiency optimization method.
Figure 12:
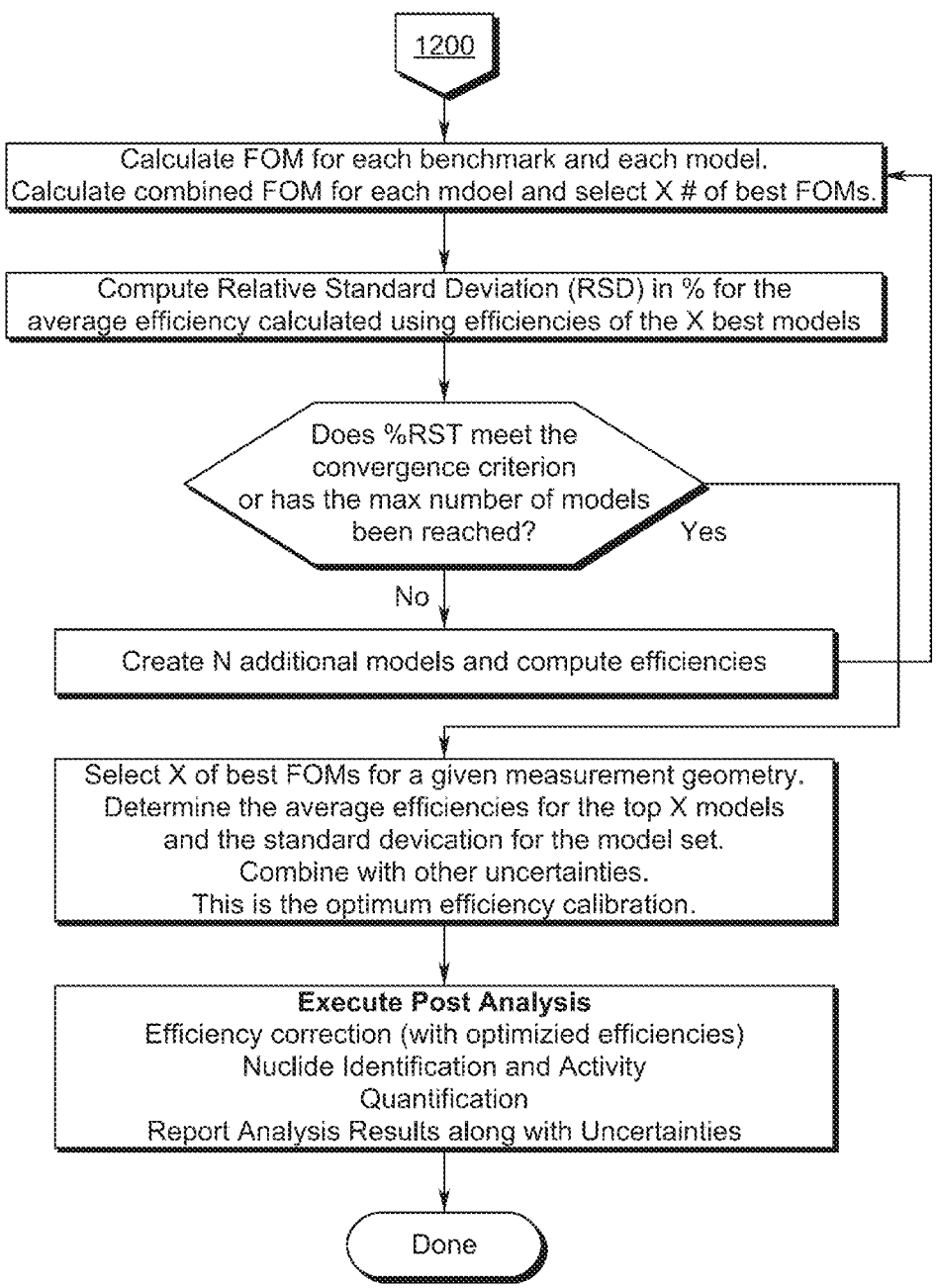
FIG. 12 illustrates an exemplary method flowchart of a preferred embodiment of the present invention implementing an exemplary automated best random fit efficiency optimization method.
Figure 13:
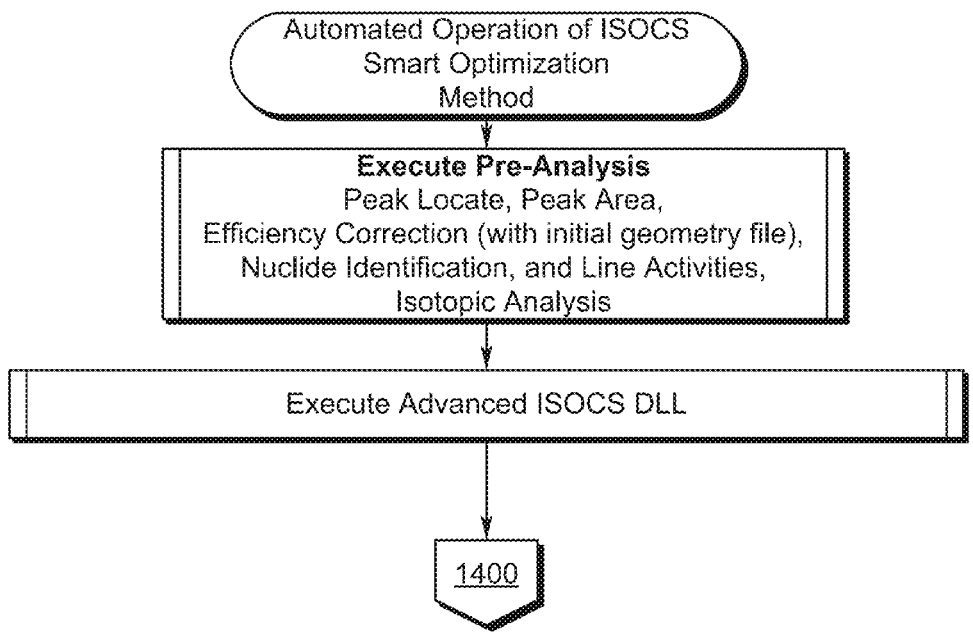
FIG. 13 illustrates an exemplary method flowchart of a preferred embodiment of the present invention implementing an exemplary automated smart routine efficiency optimization method.
Figure 14:
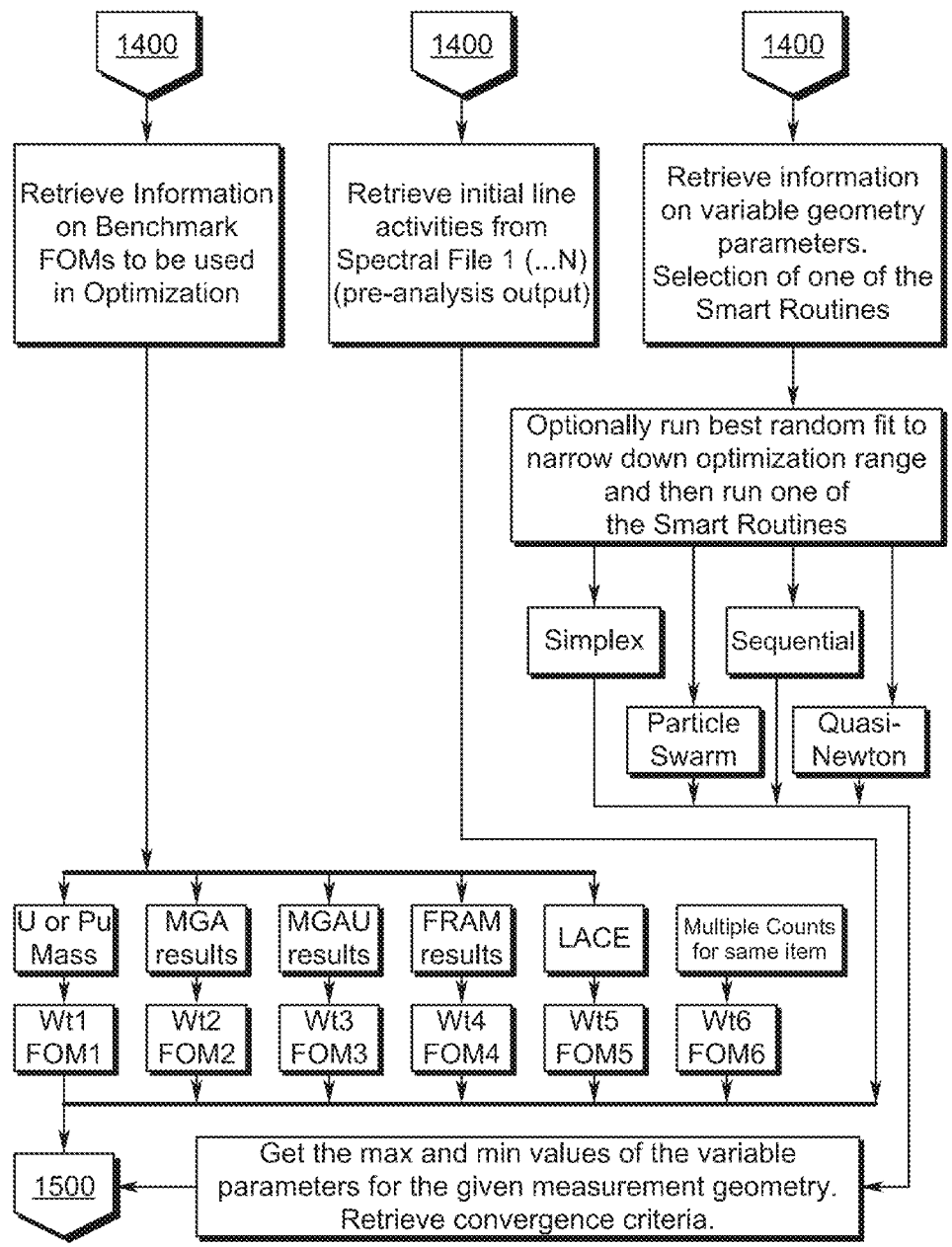
FIG. 14 illustrates an exemplary method flowchart of a preferred embodiment of the present invention implementing an exemplary automated smart routine efficiency optimization method.
Figure 15:
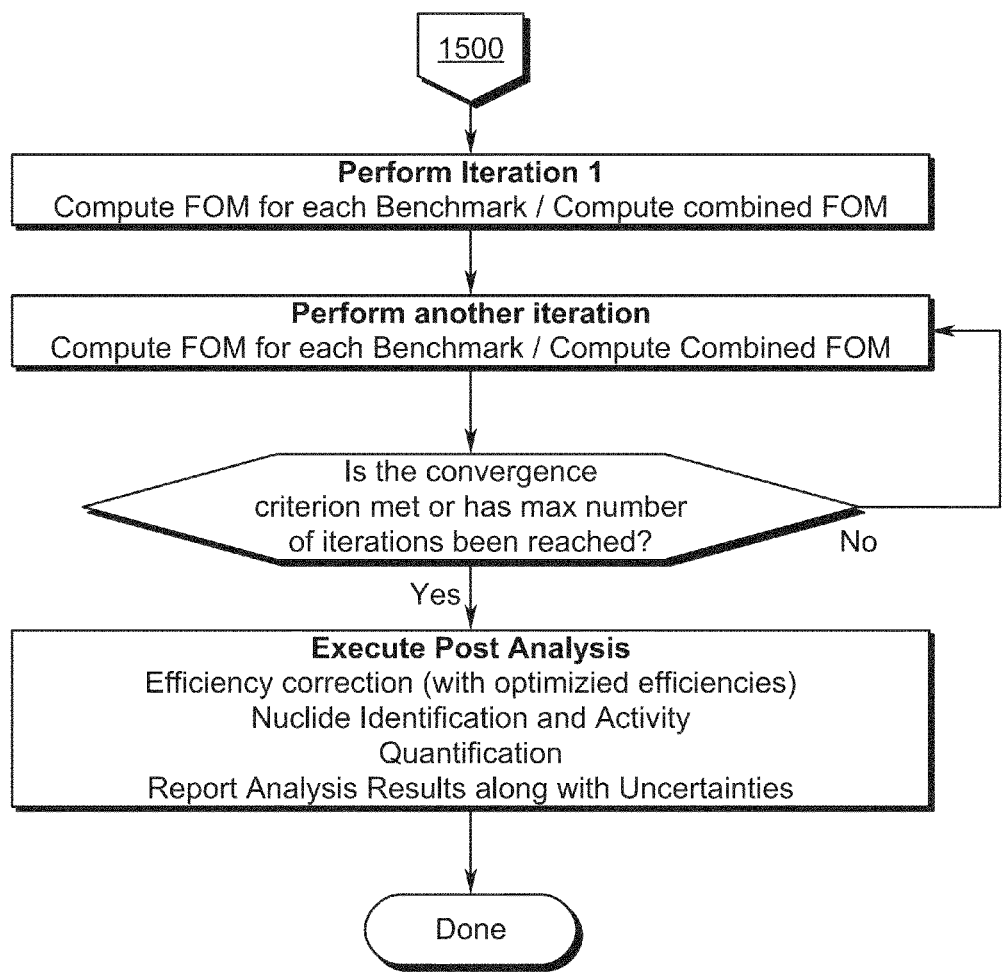
FIG. 15 illustrates an exemplary method flowchart of a preferred embodiment of the present invention implementing an exemplary automated smart routine efficiency optimization method.

A block diagram of a typical system used to implement this method is generally illustrated in FIG. 2 (0200) with a corresponding overview method flowchart generally depicted in FIG. 8 (0800). Flowcharts illustrated in FIG. 11 (1100)-FIG. 15 (1500) generally illustrate these method steps in greater detail. The flowcharts illustrated in FIG. 11 (1100)-FIG. 12 (1200) generally illustrate the automated algorithm flow when the Best Random Fit Routine is selected. The flowcharts illustrated in FIG. 13 (1300)-FIG. 15 (1500) generally illustrate the automated algorithm flow when one of the Smart methods has been selected.

Invention Methodology Summary (1600)

Figure 16:
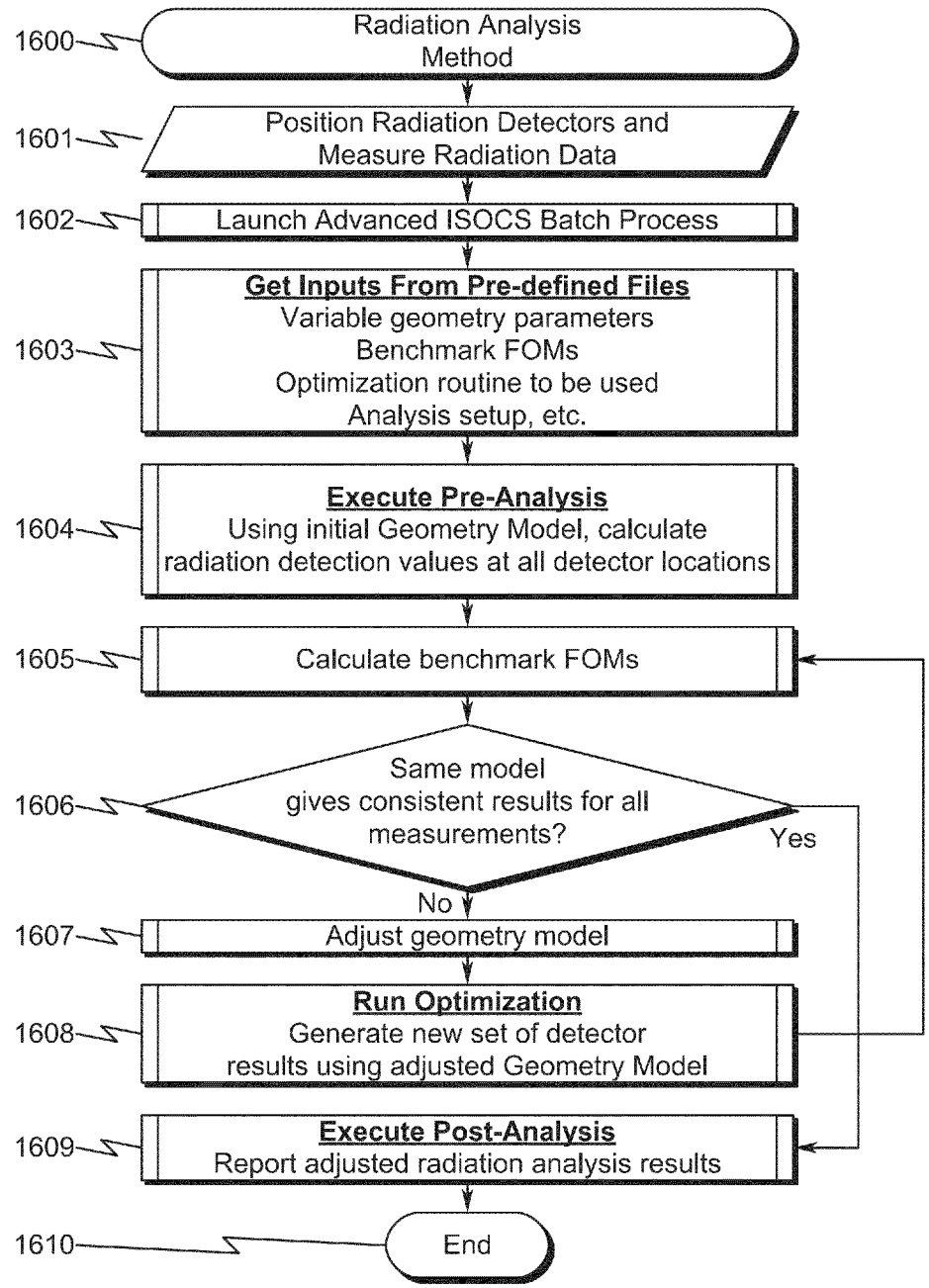
FIG. 16 illustrates an exemplary method flowchart of a preferred embodiment of the present invention summarizing the invention methodology.

The present invention may be generalized in the summary flowchart of FIG. 16 (1600), wherein the radiation analysis method is generally accomplished by the following steps:
(1) Locate a set of radiation detectors at various pre-selected measurement geometry locations with respect to a radioactive item. Record the radiation data at the pre-selected locations. Transfer the data to a computer. (1601)
(2) Launch the A-ISOCS automated optimization process from the computer. (1602)

(3) Read the Initial Geometry Parameters file. Get inputs from pre-defined files: variable geometry parameters, Benchmark FOMs, Optimization Routine to be used, etc. (1603)

(4) Using the initial geometry model, calculate radiation detection values at all detector locations. (1604)

(5) Compute one or more pre-selected benchmark FOMs. While the ratios of calculated-to-measured radiation values may be used as the dose-rate benchmark, some spectroscopy benchmarks may be calculated differently, as described elsewhere herein. This step therefore represents a generalization of this processing. (1605)

(6) Determine if the same model gives consistent results for all measurements at all measurement locations, and if so, proceed to step (9). (1606)

(7) Vary the variable geometry parameters using the Best Random Fit Routine or the Smart Routine. (1607)

(8) For each model or iteration, calculate the radiation value and the benchmark FOM by proceeding to step (5). (1608)

(9) The optimum geometry model is the one that gives consistent results with all measurements. Report optimized radiation measurement values. (1609)

(10) Once the optimization of the geometry model of the radiation source is accomplished, reliable measurement values can be calculated at any location with respect to the source. This can be a real advantage since it will help in minimizing the number of measurements to be done by human beings, thus reducing the radiation exposure to personnel, as well as the cost of the measurement campaign. (1610)

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Exemplary Best Mode Invention Embodiment

The present invention described herein performs the same function as constructing a very large number of radioactive calibration sources for physical analysis, and manually optimize by trial and error. Potentially hundreds or thousands of such source measurements may be needed to optimize which is clearly impractical if done on a manual basis. The present invention achieves the same result but by using mathematical modeling and numerical calculations.

The present invention is optimally implemented as software running within the context of a computer system wherein the software is read from a computer readable medium. This computer software program is either part of another software program that computes the calibration factor, such as the one covered under U.S. Pat. No. 6,228,664, or incorporates the portions of such program, or uses software techniques to call and utilize the required elements of this or another calibration factor software program.

Exemplary Graphical User Interface Description (1700-2400)

While the present invention may incorporate a wide variety of graphical user interfaces (GUIs), some formulations of these interfaces are preferred. In a preferred exemplary embodiment of the present invention (denoted herein as the "Advanced ISOCS Efficiency Optimization" or "A-ISOCS") the system/method is used to optimize geometry parameters that describe an item containing radioactive material, the parameters that are used in ISOCS to generate the absolute peak efficiency curve for a given counting geometry. The software uses spectral data, e.g., line activities for the isotopes present in the spectrum, data from multiple measurements of the same sample at different orientations, or information obtained by some other means, for e.g., isotopic analysis in case of uranium or plutonium items, to determine the best set of geometry parameters.

Prior to launching A-ISOCS, one or more gamma ray spectra of a given item must be acquired and the ISOCS efficiency calibration performed using a reasonable initial set of geometry parameters. After that the Nuclide Identification (NID) Analysis must be run using Canberra's spectroscopy software Genie2K (Genie2000). The results of this analysis, including peak areas, line activities, and nuclear data for the isotopes of interest are stored in the spectral file and can be accessed by A-ISOCS when performing optimization. The purpose of this preliminary NID analysis is to make calculations more efficient and not go through a full Genie2K analysis for each ISOCS model as the A-ISOCS searches for the optimum. Besides a Genie2K analysis, the user may also use an isotopic code such as MGA, MGAU, or FRAM to analyze the spectrum, if results from these codes are desired to be used as benchmarks for efficiency optimization. This additional information, such as isotopics results, relative efficiency shape information are stored either in the gamma ray spectral file or in a separate text file created by the isotopic code.

Figure 17:
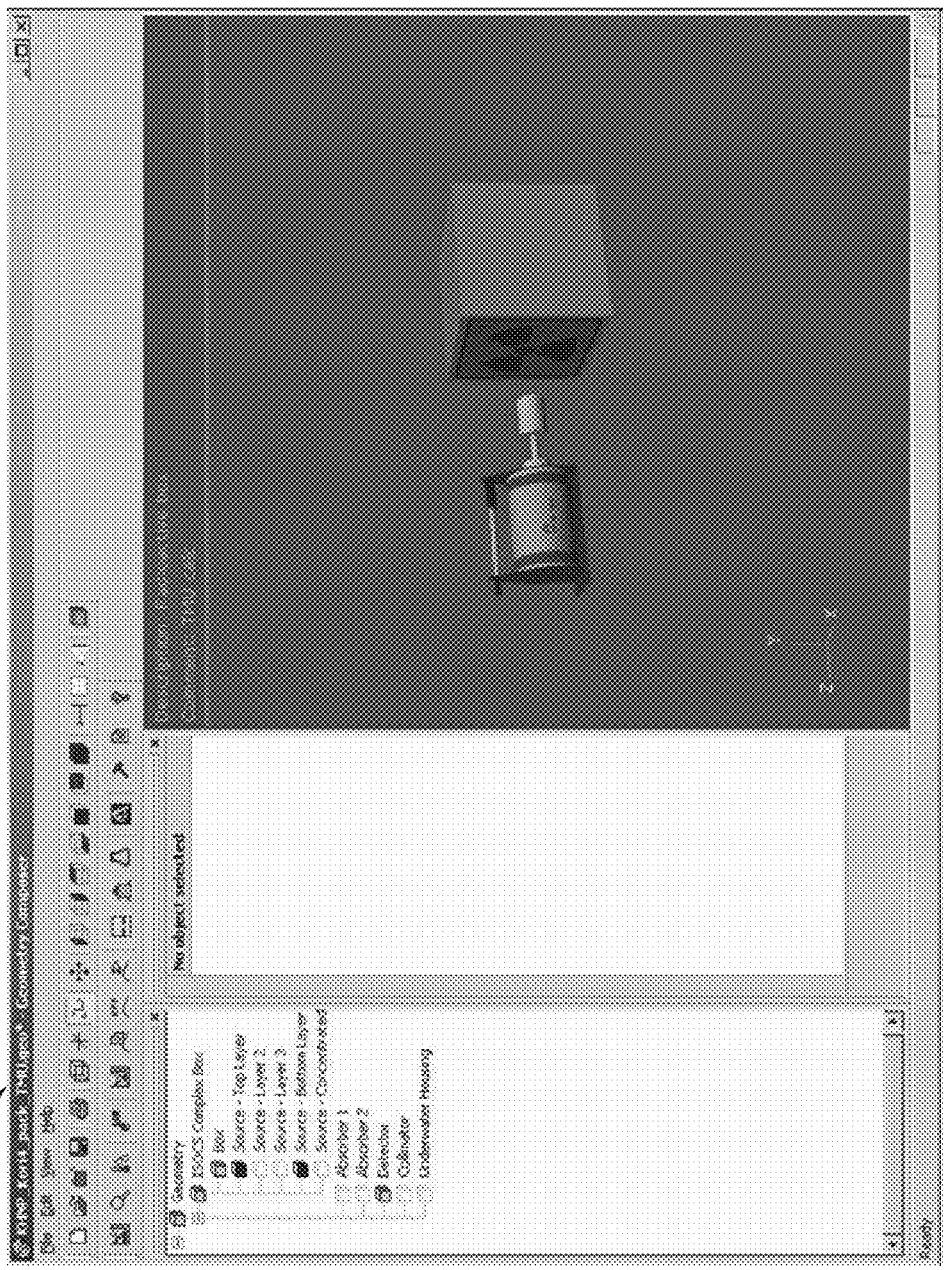
FIG. 17 illustrates an exemplary GUI used to define initial Geometry Information Setup (*.GIS) files describing the physical geometry of the radiation source.

An initial ISOCS geometry file (*.GIS) is needed for the initial efficiency calibration, and as a seed for the preliminary NID analysis. The GIS file is created by entering the geometry input parameters in the ISOCS Graphical User Interface (GUI) called the Geometry Composer (GC). The user interface of the software allows the definition of the material compositions and a distribution range for all of the variable parameters of the sample geometry. The GIS file is a text file and contains all relevant information needed by the ISOCS software to run the efficiency computation. Exemplary GUIs associated with the GC are depicted in FIG. 17 (1700) and FIG. 18 (1800).

When the geometry file is saved, the ISOCS software creates the *.GIS file. An exemplary GIS file is depicted in the Table illustrated in FIG. 19 (1900). The GIS file consists of keywords (preceded by the "~" symbol) that define each geometry parameter input by the user in GC GUI. The value of a given key word (input parameter) is indicated following the "=" sign after the keyword. The input parameters include source dimensions, source-to-detector distance, environmental parameters to calculate air density, the detector response characterization to be used etc. The input parameters defined in the GIS file are used by the ISOCS software to perform the efficiency computation for the given geometry.

Using this information, the A-ISOCS software creates a desired number of geometry models. During optimization, the efficiencies are calculated using the generated input models. Optimization can be performed either by using the "Best Random Fit" or "Smart" methods. In the first case, a large number of random geometries is created and evaluated against the selected benchmark(s). Geometries that best satisfy the optimization criteria are then used to generate the optimized efficiency curve. In case of the Smart method geometries are not randomly generated, but rather iteratively defined each time using results from the previous optimization step, thus reducing the overall number of generated models and shortening the optimization time.

Figure 20:
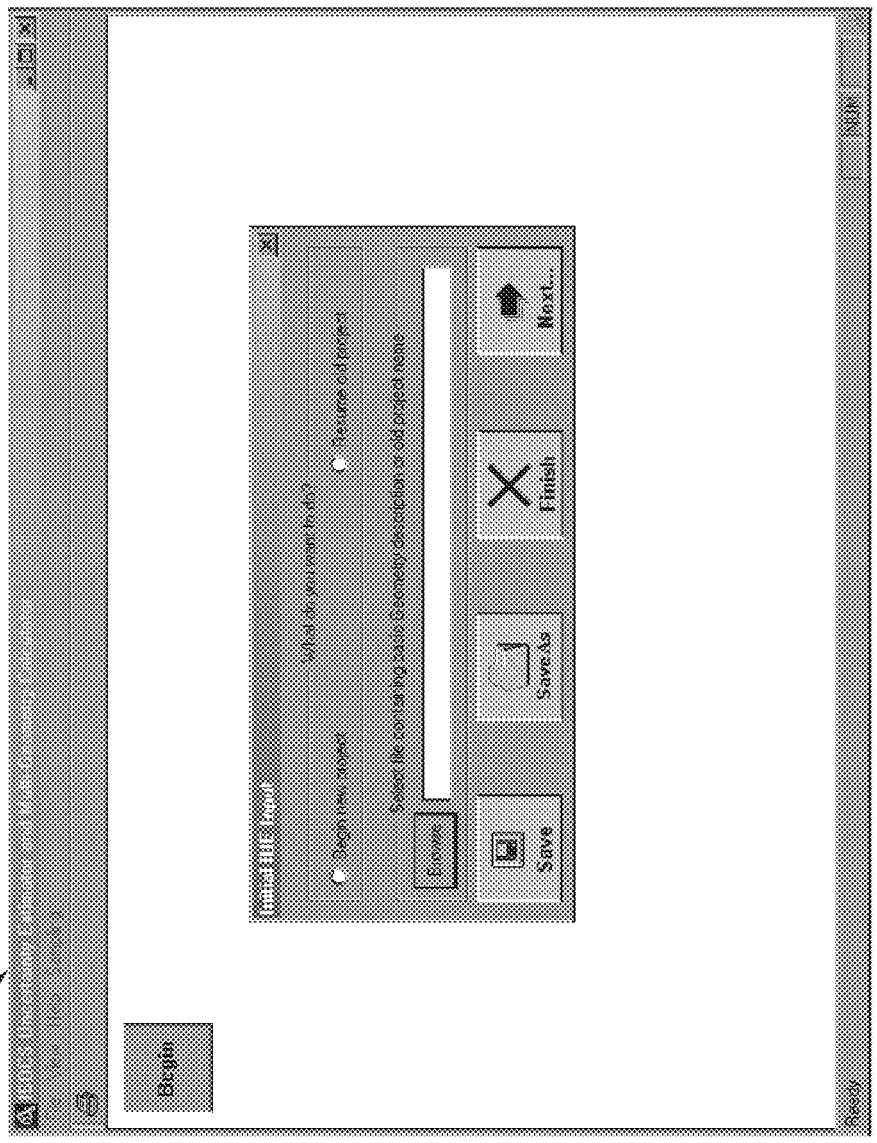
FIG. 20 illustrates an exemplary GUI dialog to create a new IUE project file or load an existing IUE project file.

After the initial geometry file has been created, the user launches the A-ISOCS software to create an IUE (ISOCS Uncertainty Estimator) project file and enters the setup information necessary to run the automated efficiency optimization. The set information includes material compositions, variable parameters, Figure of Merit (FOM) to be used in benchmarking efficiency optimization, and the type of optimization routine to be used (Best Random Fit or one of the Smart Methods). FIG. 20 (2000) depicts an exemplary GUI dialog that prompts the user to create a new IUE project file or open an existing file to make changes.

Figure 21:
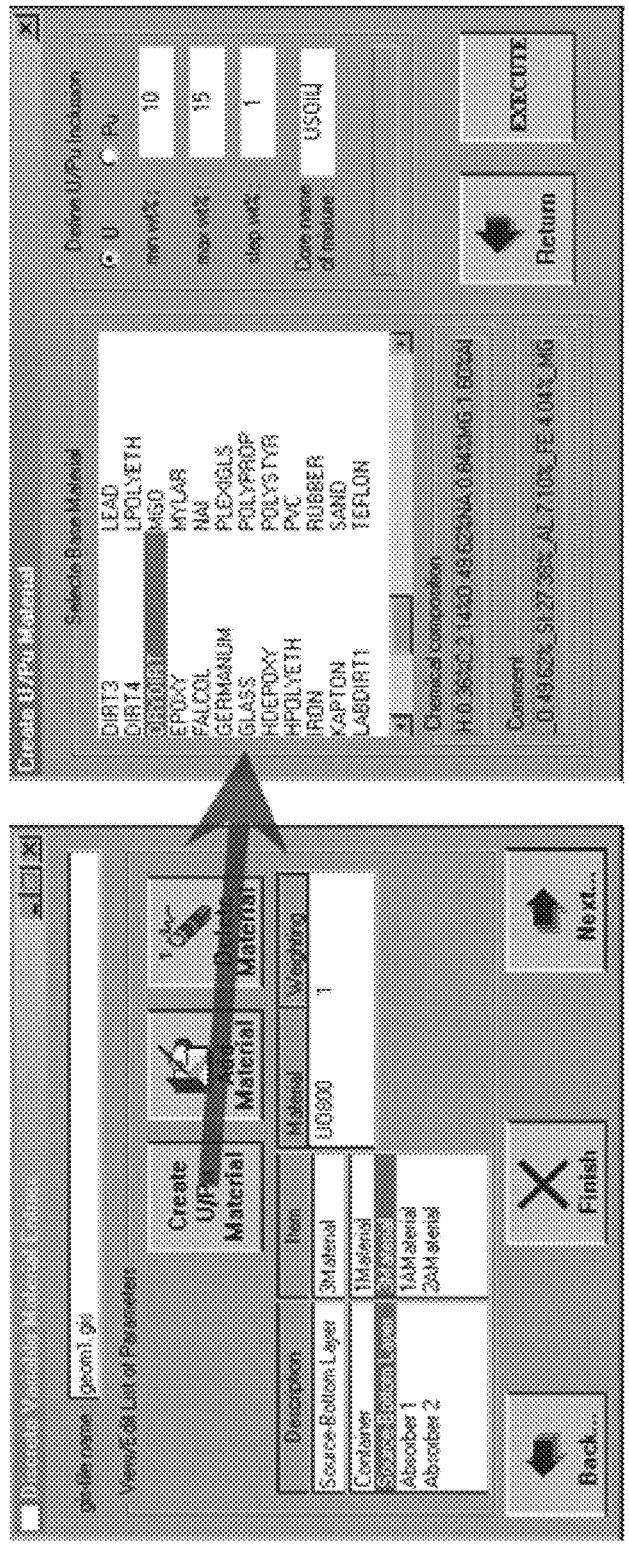
FIG. 21 illustrates an exemplary GUI dialog used to create new materials entry.
Figure 22:
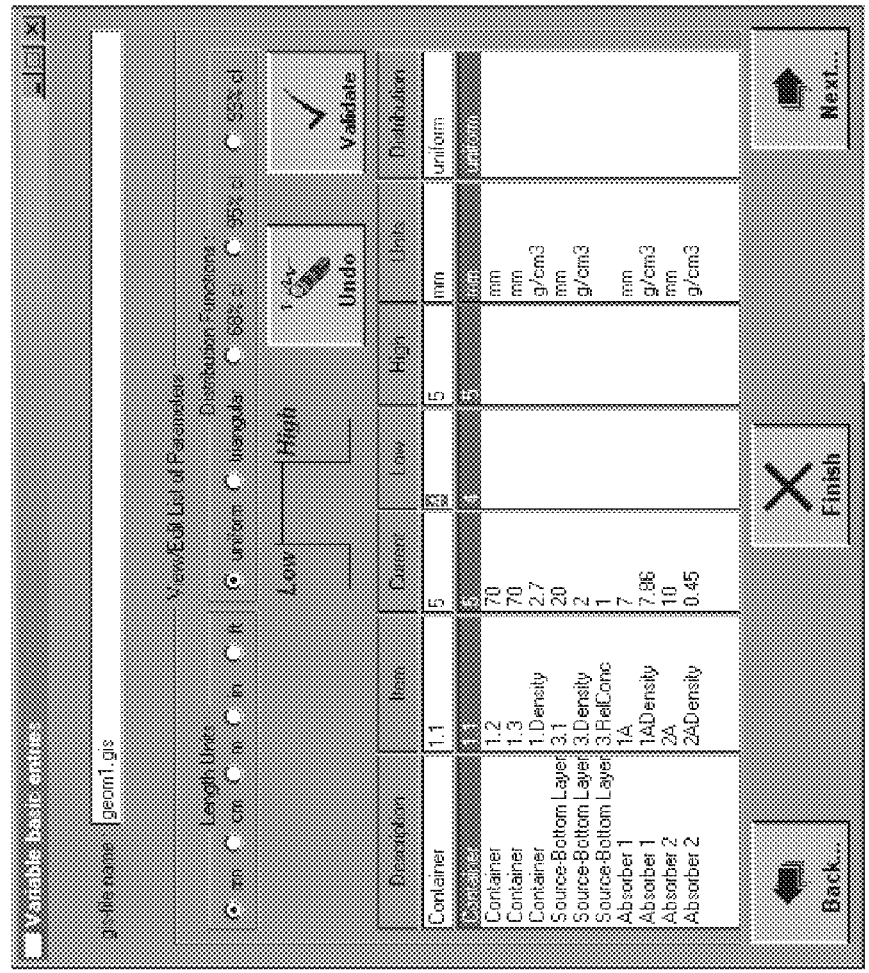
FIG. 22 illustrates an exemplary GUI dialog used to define variable parameter values.

The A-ISOCS GUIs for defining the material composition and variable parameters are depicted in FIG. 21 (2100) and FIG. 22 (2200) respectively.

Figure 23:
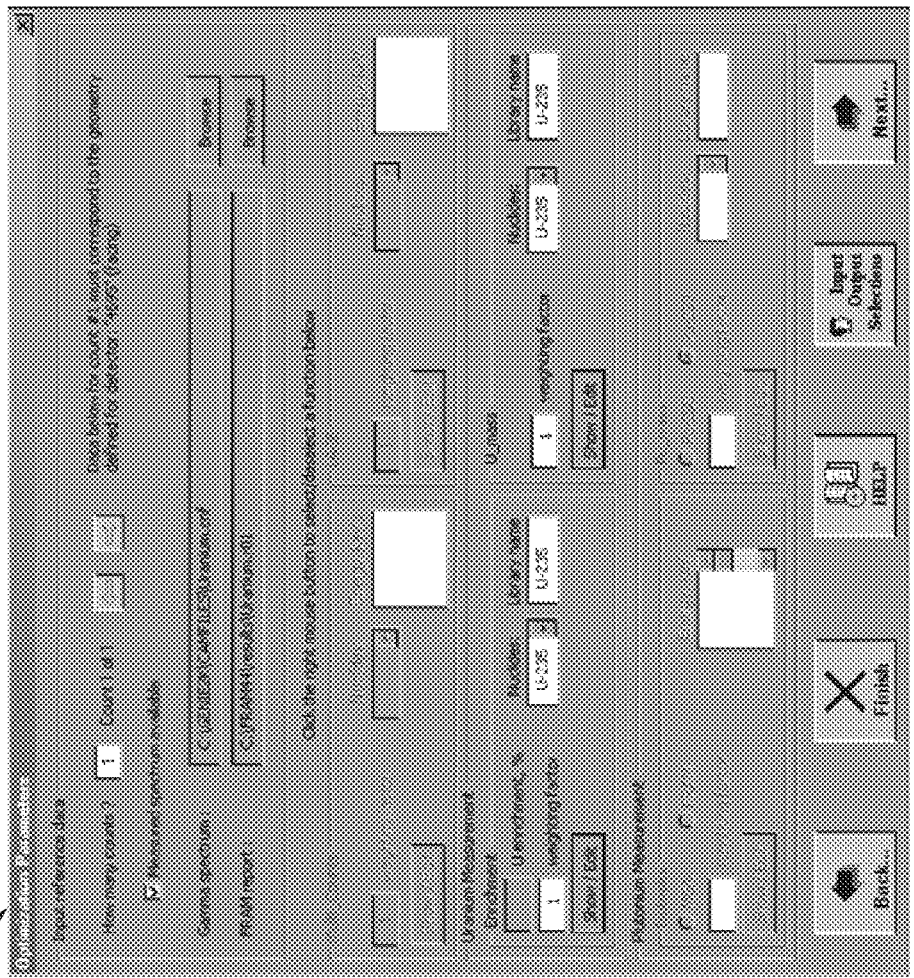
FIG. 23 illustrates an exemplary GUI dialog used to select benchmarks to be used in efficiency optimization.

The benchmark FOMs to be used in the optimization are defined using the setup screen generally depicted in FIG. 23 (2300).

Figure 24:
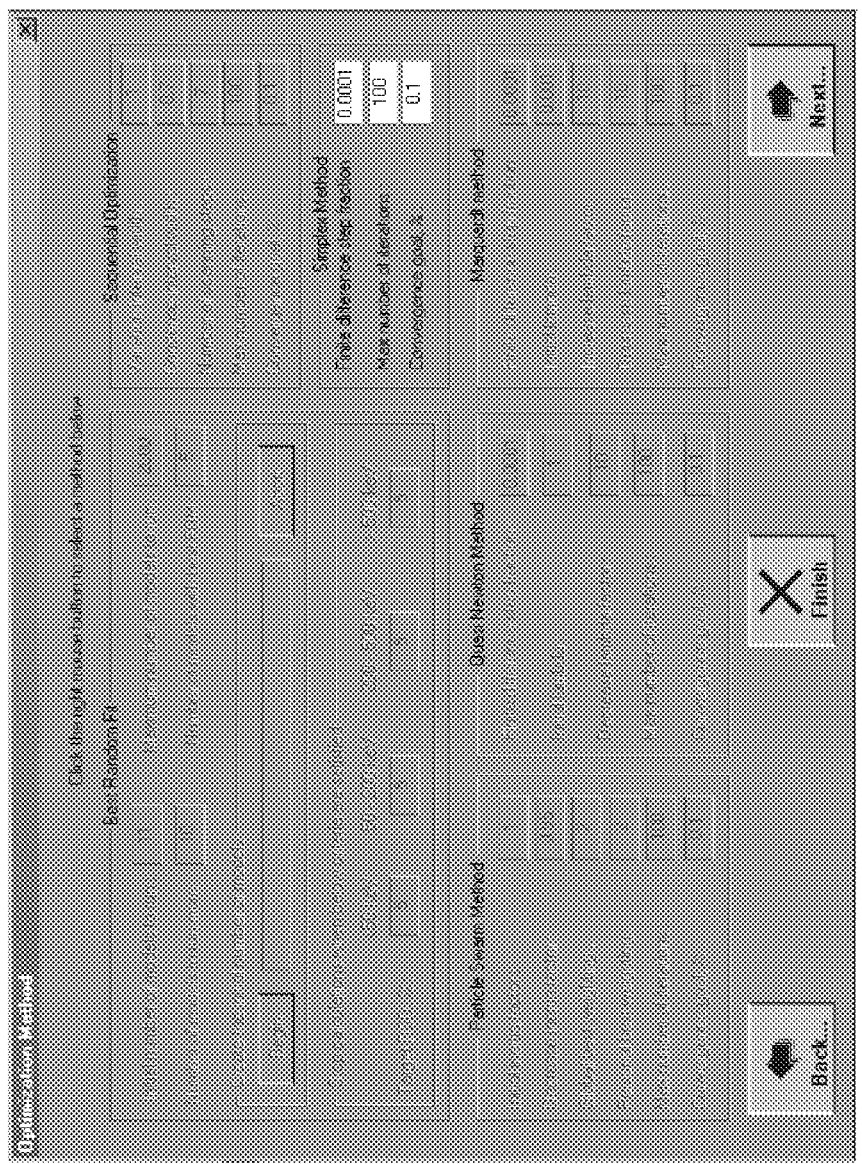
FIG. 24 illustrates an exemplary GUI dialog used to select and setup an optimization routine.

Optimization can be performed either by using the "Best Random Fit" or "Smart" methods. The user indicates the optimization methodology and the associated setup information needed to be used in the automated process. The GUI for selecting and setting up the optimization method is shown in FIG. 24 (2400).

Optimization Benchmarks

Several optimization benchmarks may be available in A-ISOCS including but not limited to the following:
MGAU/MGA;
FRAM;
Line Activity Consistency Evaluation (LACE);
User Defined Isotopics;
U or Pu Mass; and
Multiple Count.

A Figure-of-Merit (FOM) corresponding to each of the above benchmark methods may be defined. These benchmark FOMs can be used either individually or in combination.

Using the Best Random Fit or the Smart method, efficiencies are computed using the ISOCS models, and the FOM calculations are performed for the user selected benchmark method(s). The efficiency model(s) that yield the best FOM are determined and is deemed to the optimum. In the case of the Best Random Fit method, the user can select the top "X" number of efficiency candidates (that yielded the best FOMs), in which case, the optimum will be determined by averaging the efficiencies from the top "X" candidate efficiencies.

Analyzing the measured gamma ray spectrum using an isotopic computer code such as MGAU, MGA, and FRAM, yields measured isotopic ratios and relative efficiency data that is used in optimizing the shape of the ISOCS based efficiency curve. The U or Pu mass FOM compares the modeled mass from a given ISOCS model versus the mass obtained from analyzing the measured gamma ray spectrum using the efficiency from the given model. For the perfectly optimized model, the ratio of modeled mass to the mass from the measurement spectrum will be equal to unity. For radioactive items containing Uranium or Plutonium, optimizing the ISOCS efficiencies to a combination of the FOM from an isotopic analysis and the U (or Pu) mass FOM will give the best efficiency shape and magnitude, using the information available in the analyzed gamma ray spectra.

Data from measurements of a given item in multiple counting geometries are among the powerful benchmarks that could be used in an optimization. This is included in the A-ISOCS method. Also, while assaying a waste stream with fission products and activation products emitting gamma lines of multiple energies, optimizing the efficiency on the basis of line activity consistency (LACE FOM) is very powerful.

The various FOMs itemized above are discussed below in further detail.

Uranium Measurement

MGAU, FRAM, User-Defined FOM

In the case of Uranium measurements, a benchmark for efficiency optimization is the Uranium enrichment result that is available from the analysis using one of the isotopic codes (MGAU or FRAM). Or if the user has independent knowledge of the Uranium enrichment, he/she can use that information as the benchmark for optimization. The form of the Figure-of-Merit (FOM) is the same when MGAU or FRAM or User-defined enrichment benchmark is used and is given by Equation (1). The FOM with MGAU enrichment is given as an example. The equations for FRAM and User-defined are obtained by simply replacing MGAU in the superscript and subscript with FRAM or User-Defined.

$$FOM_{MGAU} = \left(\frac{\eta^{optimized} - \eta^{MGAU}}{\eta^{MGAU}}\right)^2 \quad (1)$$

In Equation (1), $\eta$ is the Uranium enrichment and $\eta^{MGAU}$ is the Uranium Enrichment from MGAU analysis of the gamma ray spectrum.

$$\eta^{optimized} = \frac{\frac{\langle A \rangle^{optimized}_{U235}}{SA_{U235}}}{\frac{\langle A \rangle^{optimized}_{U235}}{SA_{U235}} + \frac{\langle A \rangle^{optimized}_{U238}}{SA_{U238}}} \quad (2)$$

In Equation (2), the quantity $\langle A \rangle^{optimized}$ is the weighted average of line activities from $^{235}U$ or $^{238}U$ determined using Genie2K peak areas and gamma ray yields of respective gamma lines, and the ISOCS efficiencies for each model. The quantities "SA" are the specific activities of $^{235}U$ or $^{238}U$. The weighted average activity and its uncertainty are given by Equations (3)-(6):

$$\langle A \rangle^{235} = \frac{\sum_{i=1}^{M}\left(\frac{A_i^{235U}}{(\sigma_i^{A235U})^2}\right)}{\sum_{i=1}^{M}\left(\frac{1}{(\sigma_i^{A235U})^2}\right)} \quad (3)$$

$$\langle A \rangle^{238} = \frac{\sum_{j=1}^{L}\left(\frac{A_j^{238U}}{(\sigma_j^{A238U})^2}\right)}{\sum_{j=1}^{L}\left(\frac{1}{(\sigma_j^{A238U})^2}\right)} \quad (4)$$

$$(\sigma^{A238U})^2 = \cfrac{1}{\sum_{j=1}^{L}\left(\cfrac{1}{(\sigma_j^{A238U})^2}\right)} \quad (5)$$

$$(\sigma^{A235U})^2 = \cfrac{1}{\sum_{i=1}^{M}\left(\cfrac{1}{(\sigma_i^{A235U})^2}\right)} \quad (6)$$

L and M are the number of $^{238}$U and $^{235}$U gamma lines used in the optimization.

Plutonium Measurement

MGA and FRAM FOM

For plutonium measurements, a benchmark for optimization is the relative efficiency output by the isotopic code MGA. The relative efficiencies are calculated for each ISOCS model, by taking the ratio of the computed efficiency at a given energy with respect to the efficiency at a fiducial energy. In the case of plutonium analysis, the fiducial energy is 208 keV, which is an intense gamma-line that is always present in plutonium spectra.

$$FOM_{MGA} = \sum_{i=1}^{N} \frac{(\varepsilon_i^{MGA} - \varepsilon_i^{ISOCS})^2}{(\sigma_i^{MGA})^2} \quad (7)$$

where $\varepsilon_i^{ISOCS} \equiv$ ISOCS efficiency normalized at the fiducial energy (208 keV)

$\varepsilon_i^{MGA} \equiv$ MGA relative efficiency at a given energy $\sigma_i^{MGA} \equiv$ MGA relative efficiency uncertainty $N \equiv$ number of plutonium gamma lines used in the optimization The set of parameters that give the minimum $FOM_{MGA}$ corresponds to the best model. The same form of the Figure-of-Merit (FOM) is used with FRAM.

U Mass and Pu Mass FOM

Three cases have to be distinguished depending on the classification of the sample (uranium (U), general plutonium ($^{239}$Pu), or heat source plutonium ($^{238}$Pu)). The following sections provide more details on each particular case.

Figure-of-Merit (FOM) for U Mass

In this approach the total uranium mass used as input for ISOCS is compared to the total uranium mass obtained from the gamma spectrometry analysis software Genie2K after applying the modeled efficiency to the spectrum. In the ideal case the modeled uranium mass should correspond to the measured uranium mass.

The Figure-of-Merit (FOM) for uranium samples is calculated using the following formula:

$$FOM_{U\,Mass} = \left(\frac{U\,Mass^{G2k}}{U\,Mass^{ISOCS}} - 1\right)^2 \quad (8)$$

where $$U\,Mass^{ISOCS} \equiv \sum_{i=1}^{N} Volume_i^{Source} \times Density_{Matrix} \times Wt\,\%\,of\,U \quad (9)$$

$\equiv$ uranium mass modeled in ISOCS $N \equiv$ number of sources in ISOCS $$U\,Mass^{G2k} \equiv \frac{\langle A\rangle^{235}}{SA_{235U}} + \frac{\langle A\rangle^{238}}{SA_{238U}} \quad (10)$$

$\equiv$ uranium mass from Genie2k, corrected by the model efficiency $$\langle A\rangle^{235} = \cfrac{\sum_{i=1}^{M}\left(\cfrac{A_i^{235U}}{(\sigma_i^{A235U})^2}\right)}{\sum_{i=1}^{M}\left(\cfrac{1}{(\sigma_i^{A235U})^2}\right)} \quad (11)$$

$\equiv$ weighted average activities $$\langle A\rangle^{238} = \cfrac{\sum_{j=1}^{L}\left(\cfrac{A_j^{238U}}{(\sigma_j^{A238U})^2}\right)}{\sum_{j=1}^{L}\left(\cfrac{1}{(\sigma_j^{A238U})^2}\right)} \quad (12)$$

$\equiv$ weighted average activities where $SA_{235U}$ and $SA_{238U} \equiv$ specific activities ($uCi$/g 235U and $uCi$/g 238U) (13)

$A_i^{235U}$ and $A_j^{238U} \equiv$ line activities ($uCi$) from Genie2k, corrected by the model efficiency $$(\sigma^{A238U})^2 = \cfrac{1}{\sum_{j=1}^{L}\left(\cfrac{1}{(\sigma_j^{A238U})^2}\right)} \quad (14)$$

$\equiv$ weighted average activity uncertainty $$(\sigma^{A235U})^2 = \cfrac{1}{\sum_{i=1}^{M}\left(\cfrac{1}{(\sigma_i^{A235U})^2}\right)} \quad (15)$$

$\equiv$ weighted average activity uncertainty where $M \equiv$ number of 235U lines used during optimization (16)

$L \equiv$ number of 238U lines used during optimization

The A-ISOCS code retrieves the initial line activities with uncertainties and initial efficiencies (from the initial GIS model) stored as internal spectral parameters. Using these initial values, the weighted average activities $\langle A\rangle^{235}$ and $\langle A\rangle^{238}$ for the initial model is calculated using Equations (11)-(12) and used to determine the uranium mass. Then, for each batch model created by A-ISOCS during optimization, the line activities and corresponding uncertainties are calculated using the following formulae:

$$A_i^{235U} = \frac{A_i^{235Uinitial}}{\varepsilon_i} \cdot \varepsilon_i^{initial} \qquad (17)$$

$$\sigma_i^{A235U} = \frac{\sigma_i^{A235Uinitial}}{\varepsilon_i} \cdot \varepsilon_i^{initial} \qquad (18)$$

$$A_i^{238U} = \frac{A_i^{238Uinitial}}{\varepsilon_i} \cdot \varepsilon_i^{initial} \qquad (19)$$

$$\sigma_i^{A238U} = \frac{\sigma_i^{A238Uinitial}}{\varepsilon_i} \cdot \varepsilon_i^{initial} \qquad (20)$$

where $A_i^{235Uinitial}$ and $A_i^{238Uinitial} \equiv$
   line activity of the $i$-$th$ line of 235U or 238U obtained with the
      initial *ISOCS* efficiency (retrieved from the spectral file)

$\sigma_i^{A235Uinitial}$ and $\sigma_i^{A238Uinitial} \equiv$ line activity uncertainty of
   the $i$-$th$ line of 235U or 238U obtained with the initial
      *ISOCS* efficiency (retrieved from the spectral file)

$A_i^{235U}$ and $A_i^{238U} \equiv$ line activity of the $i$-$th$ line of 235U or 238U $\sigma_i^{A235U}$ and $\sigma_i^{A238U} \equiv$
   line activity uncertainty of the $i$-$th$ line of 235U or 238U $\varepsilon_i^{initial} \equiv$ initial efficiency for the $i$-$th$ line of
      235U or 238U(retrived from the spectral file)

$\varepsilon_i \equiv$ efficiency for the $i$-$th$ line $\qquad (21)$
      of 235U or 238U(calculated by *A-ISOCS*)

The average activities $\langle A \rangle^{235}$ and $\langle A \rangle^{38}$ are then calculated using Equations (11)-(12), and used in the Equation (10) to determine U Mass$^{G2k}$ for each batch model. This mass is subsequently used to calculate the FOM using Equations (8) and (9). The best model has the minimum FOM$_{U\,Mass}$.

Figure-of-Merit (FOM) for Pu Mass (239Pu)

The Figure-of-Merit (FOM) for plutonium samples is calculated using the formula below. The weight % of $^{239}$Pu and corresponding uncertainty obtained using MGA or FRAM are used in the following FOM.

$$FOM_{Pu\,Mass} = \left( \frac{Pu\,Mass^{G2k}}{Pu\,Mass^{ISOCS}} - 1 \right)^2 \qquad (22)$$

where $$Pu\,Mass^{ISOCS} \equiv \sum_{i=1}^{N} Volume_i^{Source} \times Density_{Matrix} \cdot \text{Wt \% of Pu} \qquad (23)$$

$\equiv$ plutonium mass modeled in *ISOCS*

$N \equiv$ number of sources in *IOCS*

$$Pu\,Mass^{G2k} \equiv \frac{\langle A \rangle^{239}}{SA_{239Pu}} \frac{100}{\text{wt \% 239Pu}} \qquad (24)$$

$\equiv$ plutonium mass from *Genie2k*, corrected by the model efficiency wt % 239Pu $\equiv$ weight % of 239Pu
      as reported by isotopic code (*MGA* or *FRAM*)

$$\langle A \rangle^{239} \equiv \frac{\sum_{i=1}^{K} \left( \frac{A_i^{239Pu}}{(\sigma_i^{A239Pu})^2} \right)}{\sum_{i=1}^{K} \left( \frac{1}{(\sigma_i^{A239Pu})^2} \right)} \qquad (25)$$

$\equiv$ weighted average activities $SA_{239Pu} \equiv$ specific activity of 239Pu($uCi$/g239Pu)
$A_i^{239Pu} \equiv$ line activities ($uCi$)

$$(\sigma^{A239Pu})^2 = \frac{1}{\sum_{j=1}^{K} \left( \frac{1}{(\sigma_j^{A239Pu})^2} \right)} \qquad (26)$$

$\equiv$ weighted average activity uncertainty $K \equiv$ number of 239Pu lines used during optimization The A-ISOCS code retrieves the initial line activities with uncertainties and initial efficiencies (from the initial GIS model) stored as internal spectral parameters. Using these initial values the weighted average activity $\langle A \rangle^{239}$ for the initial model is calculated using Equation (25) and used to determine the uranium mass. Then, for each batch model created by A-ISOCS during optimization, the line activities and corresponding uncertainties are calculated using the following formulae:

$$A_i^{239Pu} = \frac{A_i^{239Puinitial}}{\varepsilon_i} \cdot \varepsilon_i^{initial} \qquad (27)$$

$$\sigma_i^{A239Pu} = \frac{\sigma_i^{A239Puinitial}}{\varepsilon_i} \cdot \varepsilon_i^{initial} \qquad (28)$$

where $A_i^{239Puinitial} =$ line activity of the $i$-$th$ line of 239Pu obtained with
   the initial *ISOCS* efficiency (retrieved from the spectral file)

$\sigma_i^{A239Puinitial} =$ line activity uncertainty of the $i$-$th$
   line of 239Pu obtained with the initial *ISOCS*
      efficiency (retrieved from the spectral file)

$A_i^{239Pu} =$ line activity of the $i$-$th$ line of 239Pu $\sigma_i^{A239Pu} =$ line activity uncertainty of the $i$-$th$ line of 239Pu $\varepsilon_i^{initial} =$ initial efficiency for the $i$-$th$
      line of 239Pu(retrieved from the spectral file)

$\varepsilon_i =$ efficiency for the $i$-$th$ line of 239Pu(calculated by *A-ISOCS*) $\qquad (29)$ The average activity $\langle A \rangle^{239}$ is then calculated using Equation (25), and used in the Equation (24) to determine Pu Mass$^{G2k}$ for each batch model. This mass is subsequently used to calculate the FOM using Equations (22) and (23). The best model has the minimum FOM$_{Pu\,Mass}$.

Figure-of-Merit (FOM) for Pu Mass (238Pu)

Generally, plutonium samples contain a large fraction of $^{239}$Pu (~60-95 wt %), but in some cases (e.g., heat sources) the $^{238}$Pu content can be as high as 80 wt % or more. In this case the total plutonium mass will be best calculated using the isotopic results for $^{238}$Pu. The FOM for plutonium samples with high $^{238}$Pu content is calculated using the formula given below.

The weight % of $^{238}$Pu and corresponding uncertainty obtained using MGA or FRAM are used in the following FOM:

$$FOM_{Pu\,Mass} = \left(\frac{Pu\,Mass^{G2k}}{Pu\,Mass^{ISOCS}} - 1\right)^2 \quad (30)$$

where $$Pu\,Mass^{ISOCS} = \sum_{i=1}^{N} Volume_i^{Source} \cdot Density_{Matrix} \cdot Wt\,\%\,of\,Pu \quad (31)$$

$\equiv$ plutonium mass modeled in ISOCS $N \equiv$ number of sources in ISOCS $$Pu\,Mass^{G2k} \equiv \frac{\langle A \rangle^{238Pu}}{SA_{238Pu}} \frac{100}{wt\,\%\,238Pu} \quad (32)$$

$\equiv$ plutonium mass from Genie2k, corrected by the model efficiency wt % 238Pu = weight % of 238Pu as reported by isotopic code (MGA or FRAM)

$$\langle A \rangle^{238Pu} \equiv \frac{\sum_{i=1}^{K}\left(\frac{A_i^{238Pu}}{(\sigma_i^{A238Pu})^2}\right)}{\sum_{i=1}^{K}\left(\frac{1}{(\sigma_i^{A238Pu})^2}\right)} \quad (33)$$

$\equiv$ weighted average activites $SA_{238Pu} \equiv$ specific activity of 238Pu(uCi/g238Pu)

$A_i^{238Pu} \equiv$ line activities (uCi)

$$(\sigma^{A238Pu})^2 \equiv \frac{1}{\sum_{j=1}^{K}\left(\frac{1}{(\sigma_j^{A238Pu})^2}\right)} \quad (34)$$

$\equiv$ weighted average activity uncertainty $K \equiv$ number of 238Pu lines used during optimization The A-ISOCS code retrieves the initial line activities with uncertainties and initial efficiencies (from the initial GIS model) stored as internal spectral parameters. Using these initial values the weighted average activity of $^{238}$Pu, $\langle A \rangle^{238Pu}$ for the initial model is calculated using Equation (33) and then used to determine the uranium mass. Then, for each batch model created by A-ISOCS during optimization, the line activities and corresponding uncertainties are calculated using the following formulae:

$$A_i^{238Pu} = \frac{A_i^{238Pu\,initial}}{\varepsilon_i} \cdot \varepsilon_i^{initial} \quad (35)$$

$$\sigma_i^{A238Pu} = \frac{\sigma_i^{A238Pu\,initial}}{\varepsilon_i} \cdot \varepsilon_i^{initial} \quad (36)$$

where $A_i^{238Pu\,initial}$ = line activity of the $i$-$th$ line of 238Pu obtained with the initial ISOCS efficiency (retrieved from the spectral file)

$\sigma_i^{A238Pu\,initial}$ = line activity uncertainty of the $i$-$th$ line of 238Pu obtained with the initial ISOCS efficiency (retrieved from the spectral file)

$A_i^{238Pu}$ = line activity of the $i$-$th$ line of 238Pu $\sigma_i^{A238Pu}$ = line activity uncertainty of the $i$-$th$ line of 238Pu $\varepsilon_i^{initial}$ = initial efficiency for the $i$-$th$ line of 238Pu(retrieved from the spectral file)

$\varepsilon_i$ = efficiency for the $i$-$th$ line of 238Pu(calculated by A-ISOCS) (37)

The weighted average activity of $^{238}$Pu, $\langle A \rangle^{238Pu}$ is then calculated using Equation (33), and used in the Equation (32) to determine Pu Mass$^{G2k}$ for each batch model. This mass is subsequently used to calculate the FOM using Equations (30) and (31). The best model has the minimum FOM$_{Pu\,Mass}$.

Line Activity Consistency Evaluation (LACE) FOM

In the LACE approach, the efficiency shape that gives a consistent activity for all gamma lines from a given nuclide is deemed the best solution. The radioactive sample may contain several nuclides, each of which may emit gamma lines with multiple energies. In this case, the optimization will be performed based on all such nuclide and gamma line data. Examples of nuclides emitting gamma lines at multiple energies are: $^{235}$U, $^{238}$U, $^{239}$Pu, $^{238}$Pu, $^{60}$Co, $^{152}$Eu, etc.

The Figure-of-Merit (FOM) for the LACE approach is calculated as follows:

$$FOM_{LACE} = \sum_{NCL=1}^{M}\left[\sum_{i=1}^{K}\frac{(A_i^{NCL} - \langle A \rangle^{NCL})^2}{(\sigma_i^{DiffNCL})^2}\right] \quad (38)$$

where $$DiffNCL \equiv A_i^{NCL} - \langle A \rangle^{NCL} \quad (39)$$

$$\langle A \rangle^{NCL} \equiv \frac{\sum_{i=1}^{N}\left(\frac{A_i^{NCL}}{(\sigma_i^{ANCL})^2}\right)}{\sum_{i=1}^{K}\left(\frac{1}{(\sigma_i^{ANCL})^2}\right)}$$

$\equiv$ weighted average activites, corrected for the model efficiency $A_i^{NCL} \equiv$ line activity ($\mu Ci$) for the $i$-$th$ gamma line of a specific nuclide NCL $\sigma_i^{ANCL} \equiv$ line activity uncertainty ($\mu Ci$) for (40)

the $i$-$th$ gamma line of a specific nuclide NCL $$(\sigma_i^{DiffNCL})^2 \equiv (1 - 2 \times \alpha_i^{NCL}) \times (\sigma_i^{ANCL})^2 + \sum_{j=1}^{K}(\alpha_j^{NCL})^2 \times (\sigma_j^{ANCL})^2 \quad (41)$$

$$\alpha_i^{NCL} \equiv \frac{\frac{1}{(\sigma_i^{ANCL})^2}}{\sum_{i=1}^{K}\left(\frac{1}{(\sigma_i^{ANCL})^2}\right)} \quad (42)$$

$K \equiv$ total number of gamma lines for each specific nuclide used during optimization $M \equiv$ total number of multi-line nuclides used during optimization A-ISOCS code retrieves the initial line activities with uncertainties and initial efficiencies (from the initial GIS model) stored as internal spectral parameters. Using these initial values the weighted average activity $\langle A \rangle^{NCL}$ for the initial model is calculated using Equation (40) for each nuclide specified to be used during optimization. Then, for each model created by A-ISOCS during optimization, the line activities and corresponding uncertainties of each nuclide are calculated using the following formulae:

$$A_i^{NCL} = \frac{A_i^{NCLinitial}}{\varepsilon_i} \cdot \varepsilon_i^{initial} \quad (43)$$

-continued $$\sigma_i^{ANCL} = \frac{\sigma_i^{ANCLinitial}}{\varepsilon_i} \cdot \varepsilon_i^{initial} \quad (44)$$

where $A_i^{NCLinitial} \equiv$ line activity of the $i$-th line of a specific line
of a specific nuclide (NCL) obtained with the initial
ISOCS efficiency (retrieved from the spectral file)

$\sigma_i^{ANCLinitial} \equiv$ line activity uncertainty of the $i$-th line of
a specific nuclide (NCL) obtained with the initial
ISOCS efficiency (retrieved from the spectral file)

$A_i^{NCL} \equiv$ line activity of the $i$-th line of a specific nuclide (NCL)

$\sigma_i^{ANCL} \equiv$ line activity uncertainty
of the $i$-th line of a specific nuclide (NCL)

$\varepsilon_i^{initial} \equiv$ initial efficiency for the $i$-th line of a specific
nuclide (NCL)(retrieved from the spectral file)

$\varepsilon_i \equiv$ efficiency for the $i$-th line of a $\quad (45)$
specific nuclide (NCL)(calculated by A-ISOCS)

The average activity $\langle A \rangle^{NCL}$ is then calculated using Equation (40), and used along with line activities $A_i^{NCL}$ in the Equation (39) to determine $FOM_{LACE}$ for each model. The best model has the minimum $FOM_{LACE}$.

Composite FOM for Best Random Fit Routine

A Composite FOM is calculated based on the FOMs for the individual benchmark methods. It has been found that the absolute values of the FOMs obtained using different benchmark methods could differ by several orders of magnitude. Moreover, the FOMs behavior is different for different methods, i.e., the ratio of the FOMs calculated for the best and the worst models using one method could be several orders of magnitude large compared to the same FOM ratio, but calculated using a different method. As a result, development of a single FOM, combining several individual optimization methods, is rather a difficult task. Therefore for the Best Random Fit optimization routine, a ranking approach, independent of the absolute FOM values, was chosen to combine FOMs obtained using individual benchmark methods.

For each of the methods, a rank is assigned from 1 to n for all models based on their performance, where n is the total number of models (e.g., 50). That is, the best model in each approach is assigned #1, the second best—#2, and so on. For ties, the same median integer value is assigned.

Then for each model i the Composite FOM ($FOM_{Composite}^i$) is obtained by adding the weighted individual ranks assigned based on each of the methods j selected to be used during optimization:

$$FOM_{Composite}^i = \sum_j Rank_j^i \times WF_j^i \quad (46)$$

where $j \equiv$ MGAU, FRAM, MGA, LACE,
UMass, or User Defined Isotopics $WF_j^i \equiv$ weighting factors specified by the user for each method $j$ The overall best model has the minimum $FOM_{Composite}^i$. All models are then ranked again from 1 (best) to n (worst) based on the $FOM_{Composite}^i$. That new rank, called a Composite rank ($Rank_{Composite}^i$) is used in case of multiple counts.

Multiple Counts FOM

The FOM for multiple counts is determined as follows. The models are generated for each of the different detector configurations. For the multi-count option it is assumed that the same sample is being measured from different perspectives. The multi-count optimization is implemented by requiring that the output Nuclide Activity of all counts of the item should be as close as possible to each other (i.e., the relative standard deviation of the Nuclide Activity of the different counts is as small as possible). The relative standard deviation of the Nuclide Activity obtained with each count for each specified nuclide is calculated. If there are more than one nuclide specified, then a ranking scheme described below is used to combine the results.

The weighted average activity for a specific nuclide for each individual count is calculated using the following formula:

$$\langle A \rangle_{NCL}^{CNT} = \frac{\sum_{i=1}^{K} \left( \frac{[A_i^{NCL}]^{CNT}}{([\sigma_i^{ANCL}]^{CNT})^2} \right)}{\sum_{i=1}^{K} \left( \frac{1}{([\sigma_i^{ANCL}]^{CNT})^2} \right)} \quad (47)$$

$\equiv$ weighted average activities,
corrected for the model efficiency where $[A_i^{NCL}]^{CNT} \equiv$ line activity (uCi) for the $i$-th gamma line of a $\quad (48)$
specific nuclide NCL obtained for each individual count CNT $[A_i^{ANCL}]^{CNT} \equiv$ line activity uncertainty (uCi) for the $i$-th gamma line of
a specific nuclide NCL obtained for each individual count CNT A-ISOCS code retrieves the initial line activities with uncertainties and initial efficiencies (from the initial GIS model) stored as internal spectral parameters. Using these initial values the weighted average activity $\langle A \rangle_{NCL}^{CNT}$ for the initial model is calculated using Equation (47) for each nuclide specified to be used during optimization. Then, for each model created by A-ISOCS during optimization for each count, the line activities and corresponding uncertainties of each nuclide are calculated using the following formulae:

$$[A_i^{NCL}]^{CNL} = \frac{[A_i^{NCLinitial}]^{CNT}}{\varepsilon_i} \times \varepsilon_i^{initial} \quad (49)$$

$$[\sigma_i^{ANCL}]^{CNT} = \frac{[\sigma_i^{ANCLinitial}]^{CNT}}{\varepsilon_i} \times \varepsilon_i^{initial} \quad (50)$$

where $[A_i^{NCLinitial}]^{CNT} \equiv$ line activity of the $i$-th line of a specific nuclide
(NCL) obtained with the initial ISOCS efficiency for
each individual count (retrieved from the spectral file)

$[\sigma_i^{ANCLinitial}]^{CNT} \equiv$ line activity uncertainty of the $i$-th line of a specific
nuclide (NCL) obtained with the initial ISOCS efficiency
for each individual count (retrieved from the spectral file)

$[A_i^{NCL}]^{CNT} \equiv$ line activity uncertainty of the $i$-th line of
a specific nuclide (NCL) for each individual count -continued $[\sigma_i^{ANCL}]^{CNT} \equiv$ line activity uncertainty of the $i$-$th$ line (51)
of a specific nuclide (NCL) for each individual count
$\varepsilon_i^{initial} =$ initial efficiency for the $i$-$th$ line of a specific
nuclide (NCL)(retrieved from the spectral file)
$\varepsilon_i =$ efficiency for the $i$-$th$ line of a specific
nuclide (NCL)(calculated by A-ISOCS)

For each nuclide NCL, the standard deviation of the weighted average activities ($SD_{NCL}^i$) obtained with each count is then computed for each model i using the following formula:

$$SD_{NCL}^i = \sqrt{\frac{\sum_{CNT=1}^{N}(\langle A\rangle_{NCL}^{CNT} - \overline{\langle A\rangle_{NCL}})^2}{N-1}} \quad (52)$$

$$\overline{\langle A\rangle_{NCL}} = \frac{\sum_{CNT=1}^{N}\langle A\rangle_{NCL}^{CNT}}{N} \quad (53)$$

where $\langle A\rangle_{NCL}^{CNT} \equiv$ weighted average activity obtained for a specific (54)
nuclide (NCL) with each individual count (CNT)
$\overline{\langle A\rangle_{NCL}} \equiv$ weighted average activity of a specific
nuclide averaged over all counts
$N \equiv$ number of counts
$i \equiv$ model number All models are ranked from 1 (best) to n (worst) based on the $SD_{NCL}^i$ for each nuclide, with the best rank assigned to the model having the smallest standard deviation. The multi-count FOM for each model i ($FOM_{multiple}^i$) is then calculated by adding up the individual ranks for each nuclide.

If the optimization is performed using data from multiple nuclides, then the Multiple Count FOM takes the form of the following equation:

$$FOM_{Multiple}^i = \sum_{NCL=1}^{M} SD_{NCL}^i \quad (55)$$

where $M \equiv$ number of nuclides specified to be used during optimization $i \equiv$ model number All models are then ranked from 1 (best) to n (worst) based on the $FOM_{multiple}^i$. That new rank, called a multiple rank ($Rank_{multiple}^i$) is assigned for each model i.

The following method is used to include the Multi Count FOM in case of the Best Random Fit optimization approach.

For each individual count CNT a Composite rank of each model ($[Rank_{Composite}^i]^{CNT}$) is available. The composite ranks for each count and the multiple rank are summed for each model i to create a multi-combined FOM.

$$[FOM_{Multiple}^{Combined}]^i = \quad (56)$$
$$\left(\sum_{CNT=1}^{N}[Rank_{Composite}^i]^{CNT}\right) + Rank_{Multiple}^i \times WF_{Multiple}$$

where $WF_{Multiple} \equiv$ weighting factor for multiple counts

All models are ranked again based on the $[FOM_{Multiple}^{Combined}]^i$. The model that corresponds to the least rank is the best model.

SMART Methods

The smart methods employed in A-ISOCS are well known numerical routines that perform a directed search for an optimum solution. Several numerical routines are presently anticipated by the present invention for implementation of the efficiency optimization. These include:
Sequential Optimization;
Downhill Simplex;
Particle Swarm;
Quasi-Newton; and
Marquardt.
Of these, the Downhill Simplex is preferred in many embodiments. Each method is briefly discussed below.
Sequential Optimization
The Sequential Optimization Method treats each free parameter separately, in an iterative sequence of one dimensional grid samples. One free parameter is sampled evenly across the current bounds while the other free parameters are held constant. The best value of the varied parameter is set and then the next free parameter is treated. If the best line sample is not at an edge, parabolic interpolation is used to improve the estimation. This continues until all of the parameters have been optimized. Then the sequence is repeated with bounds that have been reduced and re-centered on the new best values. This reduction in range forcibly sets the rate of convergence, which must be balanced against the risk of falling into a local minimum because of an inadequate search. The Sequential method maintains all sampled points inside the parameter bounds by always maintaining the iteration limits inside the parameter bounds.
Downhill Simplex
The Downhill Simplex (Nelder-Mead) Method involves continuously improving the FOMs of models represented by points in the solution space at the vertices of a multidimensional form, or simplex. An initial simplex is established with one vertex more than the number of free parameters, and all of these point models are evaluated. The points are sequentially improved by simultaneously adjusting all of the free parameters in the point with the worst FOM. After the worst point is improved and is no longer the worst point, the new worst point is improved. Improvements are performed by reflecting, expanding or contracting the worst point through the centroid of the other points. If none of these three trials improves the worst point to better than the second worst point, all of the points are contracted halfway towards the point with the current best FOM. The Simplex method maintains all sampled points inside the parameter bounds by truncating any parameter values attempting to extend beyond the bounds. The vertices are initialized with one point at the center of each parameter range and the other points randomly located.

Particle Swarm

The Particle Swarm Optimization Method involves a group of models or particles simultaneously sampling all of the free parameters within bounds in an iterative manner. Each model remembers the point with the best personal FOM that it has experienced, and all of the models are aware of the global best point any particle has ever experienced. These memories determine where each point should next sample. Each point has a velocity that includes some inertia from the last step as well as stochastically sampled vectors from the current position to the best personal and best global positions. The Swarm method maintains all sampled points inside the parameter bounds by truncating any parameter values attempting to extend beyond the bounds, with a small stochastic offset. The number of particles is set to one more than the number of free dimensions. The particles are initialized with one point at the center of each parameter range and the other points randomly located. Initial velocities are set randomly in proportion to the range of parameter bounds.

Quasi-Newton

The Quasi-Newton Method is an inverse Hessian approach that progressively determines the inverse curvature matrix using only gradient and location vectors without explicitly determining or inverting the curvature matrix. The trial point starts at the center of each parameter range. The gradient vector is determined via finite difference (forward difference) and the inverse curvature matrix is initialized to the identity matrix. The step vector is determined by multiplying the current inverse curvature matrix by the negative gradient. A scaling factor is applied to the step vector that is either one or a fraction if needed to keep inside all parameter bounds. The FOM is determined at the full step and half step. If neither improves over the original point, the step size is reduced by orders of magnitude until a test point achieves an improved FOM. If the best FOM is a full step, the new step is taken. If the best FOM is a half-step, a trial is made at the parabolic interpolation and the best FOM becomes the new location. At the new location, the gradient is determined by finite difference. The old and new location gradients and parameter values are used to directly update the inverse curvature matrix using the Broyden-Fletcher-Goldfarb-Shanno (BFGS) formula. The new step vector is calculated and the iterations progress, with the scaling factor reset to one or the current bounding fraction. Each gradient determination for N free parameters costs N+1 calculations of the FOM. The scaling factor maintains all parameters within the specified limits.

Marquardt

In mathematics and computing, the Levenberg-Marquardt ("Marquardt") algorithm (LMA), also known as the damped least-squares (DLS) method, provides a numerical solution to the problem of minimizing a function, generally nonlinear, over a space of parameters of the function. These minimization problems arise especially in least squares curve fitting and nonlinear programming.

The LMA interpolates between the Gauss-Newton algorithm (GNA) and the method of gradient descent. The LMA is more robust than the GNA, which means that in many cases it finds a solution even if it starts very far off the final minimum. For well-behaved functions and reasonable starting parameters, the LMA tends to be a bit slower than the GNA. LMA can also be viewed as Gauss-Newton using a trust region approach.

The LMA is a very popular curve-fitting algorithm used in many software applications for solving generic curve-fitting problems. However, the LMA finds only a local minimum, not a global minimum.

Smart Method Summary

After testing the various smart methods, the following conclusions were reached.

The Quasi-Newton method is prone to inaccuracies due to the approximation of the Hessian when dealing with discrete optimization variables such as materials even though it is the fastest method to reach convergence.

The Sequential method showed very slow convergence and good only when the optimization intervals are relatively small.

The Downhill Simplex method was faster than the Particle Swarm method even though both showed comparable convergence/accuracy behaviors.

The Downhill Simplex method is best suited based on speed, accuracy, ability to handle discrete variables, and simplicity of usage.

When run on a computer with CPU speed of 2.8 GHz and a 3.5 GB RAM, the Best Random Fit routine may take several tens of hours to converge to a solution especially for highly attenuating source geometries. In many cases, the routine could reach the maximum number of models before reaching the desired level of convergence. By contrast, Smart routines such as Simplex converge to a solution within tens of minutes or an hour for the same geometries. There is a distinct advantage in using the smart routines because of the much shorter computation times. A disadvantage of using smart routines is the possibility of the solution falling into a local minimum during the optimization.

Combined U Enrichment and U Mass FOM (Smart Routines Only)

An especially useful FOM in the field of nuclear safeguards and materials inventory is the combination of optimizing with respect to Uranium enrichment (from MGAU/FRAM/User defined) and Uranium mass. However, when using a Smart routine for optimization, the ranking scheme to combine FOMs is not conducive. The U enrichment and U mass FOMs can be combined in a straightforward manner as given by the equation below:

$$FOM_{MGAU+UMass} = \sqrt{\left(\frac{\eta^{optimized} - \eta^{MGAU}}{\eta^{optimized}}\right)^2 + \left(\frac{U\ Mass^{G2k}}{U\ Mass^{ISOCS}} - 1\right)^2} \quad (57)$$

The combined U enrichment and U mass FOM is based on the quadrature sum of the U enrichment and U mass FOMs.

Composite/Multiple Count FOM for Non-U Measurements

For non-Uranium measurements that use benchmark results from MGA, FRAM, LACE, and/or Pu Mass analysis, the composite FOM that is used is given by the equation below:

$$FOM^i_{Composite} = \prod_j (FOM^i_j)^{WF_j} \quad (58)$$

where $j \equiv MGAU, FRAM, MGA, LACE,$ or $UMass$ $WF_j \equiv$ weighting factors specified by the users for each method $j$ When multiple counts are performed, the composite FOM for each count will be combined with the Multiple Count FOM as follows:

$$\text{Combined: } [FOM_{Multiple}^{Composite}]^i = \left(\sum_{NCL=1}^{M} SD_{NCL}^j\right)^{WF_{multiple}} \times \prod_{CNT=1}^{N}\left(\prod_j (FOM_j^i)^{WF_j^{CNT}}\right) \quad (59)$$

where $M \equiv$ the number of nuclides $N \equiv$ the number of counts $SD_{NCl}^j \equiv$ defined by Equation (52)

$j \equiv$ MGAU, FRAM, MGA, LACE, or UMass $WF_j^{CNT} \equiv$ weighting factors specified by the user for each method $j$ and count CNT

Application Using Uranium Carbide Item Measurements

Measurement Setup (2500)

Figure 25:
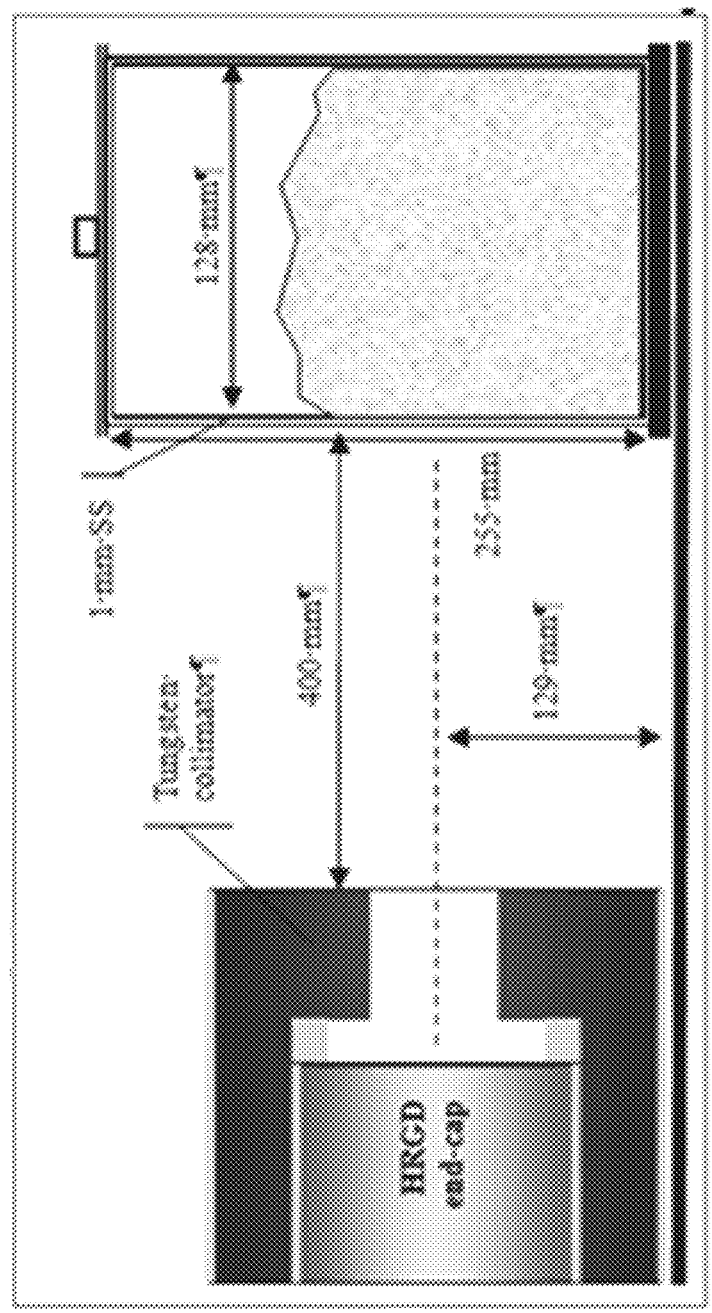
FIG. 25 illustrates an application example of the present invention using a measurement setup from uranium carbide items and depicts a typical counting geometry for Uranium Carbide items.

While the present invention may incorporate a wide variety of application contexts, a typical application context will now be presented within the context of an application example using measurements from uranium carbide items. This set of measurements included counts performed with uranium items containing different amounts of uranium and graphite (carbon) mix. Each item was measured from the side. All measurements were done using a collimated High Purity Germanium (HPGe) gamma ray detector. The typical measurement geometry is shown in FIG. 25 (2500).

One of the distinct features of this set of measurements was the fact that the uranium content in the reference uranium/carbon mix was not precisely known. Therefore the uranium WT % was one of the variables used during optimization. However, the total matrix mass has been known for all measurements. Since it is a quite common case when the total material mass is known during the measurement (gross mass of the item minus the mass of an empty container, which is usually known in advance for the standard container types), the total matrix mass was set to be constant during the optimization.

Uranium Carbide Sampling Conditions (2600, 2700, 2800)

The tables provided in FIG. 26 (2600), FIG. 27 (2700), and FIG. 28 (2800) provide details regarding the different uranium carbide items that were measured. The gamma ray spectrum from each uranium carbide item was analyzed following the processes shown in the flow charts shown in FIGS. 8, 9, and 10. The benchmarks (FOM) selected for the optimization were the Uranium enrichment from the MGAU isotopic code analysis, and the Uranium mass. The FOM is given in Equations (1) and (8) (for Best Random Fit) and Equation (57) (for Downhill Simplex). The optimization was carried out in turn by using the Best Random Fit routine and the Downhill Simplex smart routine. The relevant setup information for the downhill simplex method was as follows:

Convergence criterion set to 0.1%

Maximum number of iterations was set to 200.

Optimization Results (2900)

Figure 29:
FIG. 29 illustrates optimization results for Uranium 1/2/3 test item sources used in an application example of the present invention.

Results shown in the table of FIG. 29 (2900) indicate that the Uranium masses determined using the A-ISOCS method are in good agreement with the declared values. If the user did not use the A-ISOCS optimization and guessed at the geometry parameters, the results could potentially be biased by a factor of two (2) or more. If no reliable declared values are available for the unknown items, then the user has no way of checking the accuracy of the results when using a best guess efficiency. The optimization routine eliminates the guessing game and provides the user with reliable convergence of the FOM results. The above data set also shows that the accuracy of the Simplex and Best Random Fit based optimizations are very comparable. The major difference is that the computation times using the Simplex are faster by an order of magnitude.

Typical FOM Convergence (3000, 3100, 3200)

Figure 30:
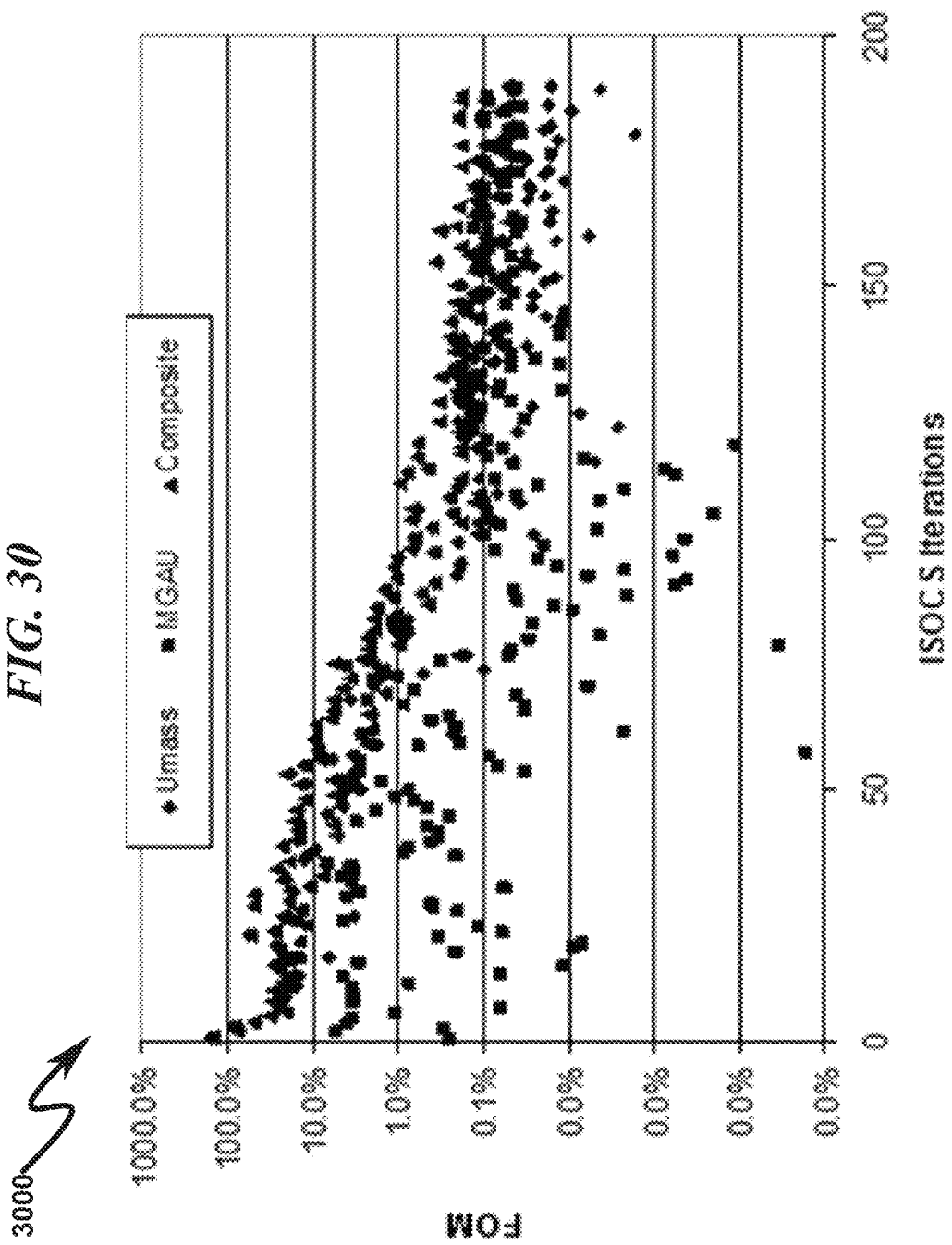
FIG. 30 illustrates a plot of the convergence of the FOM using the Simplex Routine in an application example of the present invention for a Uranium 1 test sample.
Figure 31:
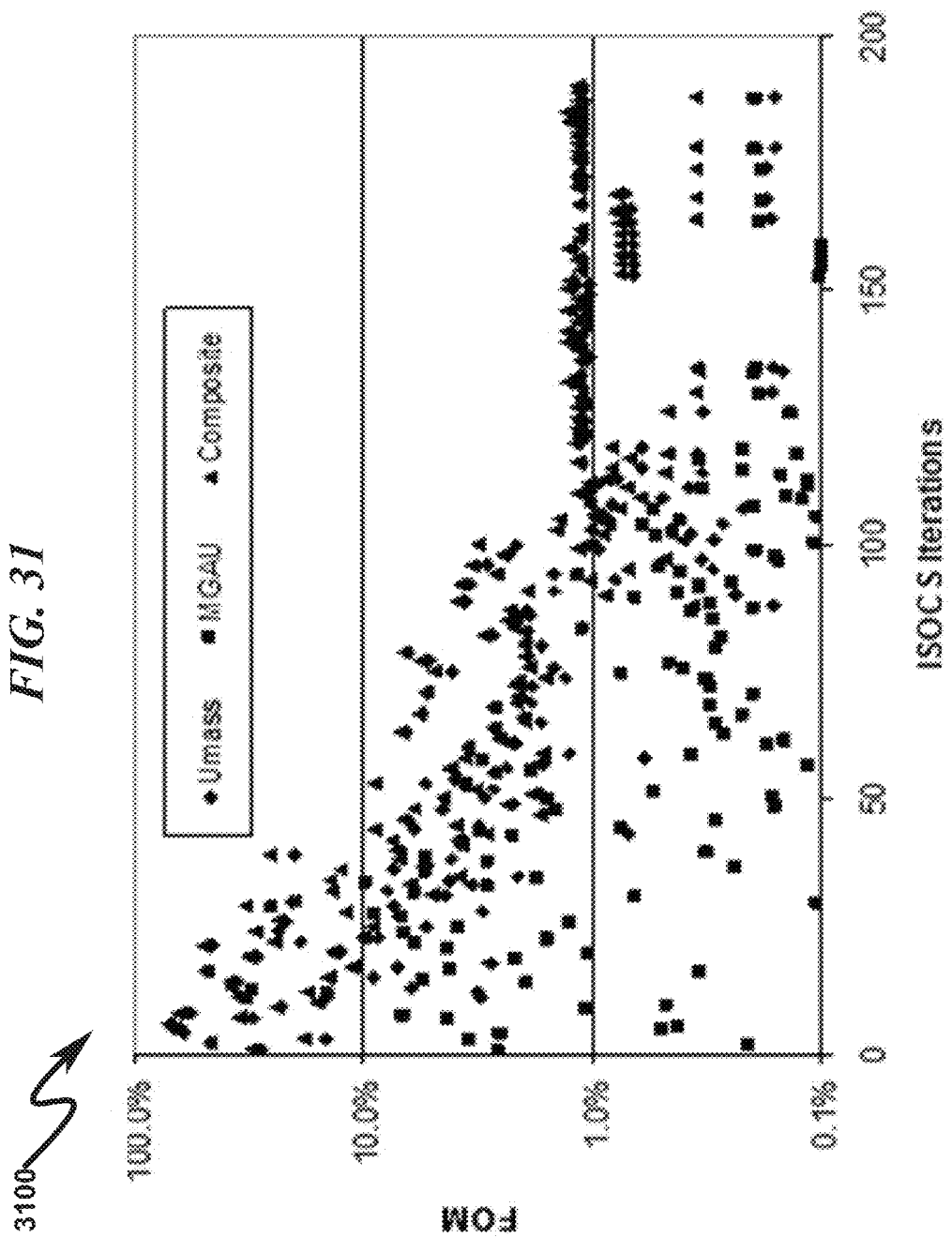
FIG. 31 illustrates a plot of the convergence of the FOM using the Simplex Routine in an application example of the present invention for a Uranium 2 test sample.
Figure 32:
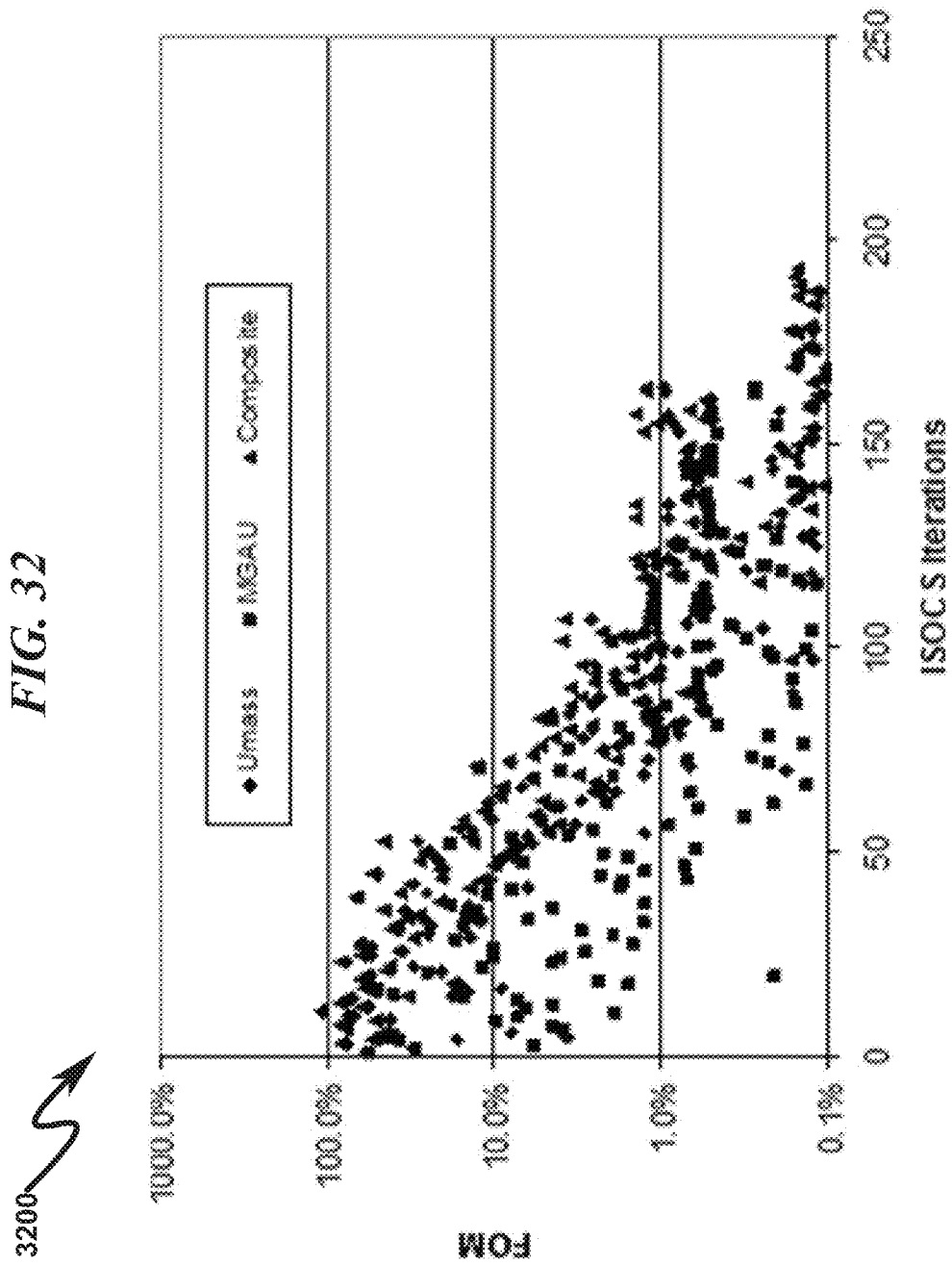
FIG. 32 illustrates a plot of the convergence of the FOM using the Simplex Routine in an application example of the present invention for a Uranium 3 test sample.

FIG. 30 (3000), FIG. 31 (3100), and FIG. 32 (3200) depict plots of the convergence of the Figure-Of-Merit (FOM) convergence with the number of iterations of Simplex routine, for Uranium Carbide 1, 2, and 3 respectively. In all three cases, the required convergence of 0.1% was reached before the set maximum number of iterations of 200. The above examples are only a fraction of the number of cases that were run to verify and validate the A-ISOCS based optimization.

System Summary

The present invention system anticipates a wide variety of variations in the basic theme of construction, but can be generalized as a radiation analysis system comprising:

(a) radiation source detection subsystem (RSDS);
(b) batch definition processor (BDFP);
(c) pre-analysis processor (PREP);
(d) efficiency optimization processor (EOPT); and
(e) post-analysis processor (POST);

wherein the RSDS is configured with a radiation sensor (RSEN) to detect radiation emitted from a radiation sample (RSAM) and output digital radiation detection values (DRDV) associated with the emitted radiation;

the BDFP is configured to accept user input from a graphical user interface (GUI) to define radiation analysis parameters (RAP) to be used in analyzing the RS;

the PREP is configured to read the DRDV and perform a preliminary analysis to define a RSAM efficiency estimate (RSEE);

the EOPT is configured to analyze the DRDV and perform an automated efficiency value optimization (AEVO) to generate absolute efficiency values (AEV) for the RSAM using the RAP and the RSEE as a starting point for the analysis;

the EOPT is configured to rank the AEVO with a Figure-Of-Merit (FOM) based on the correlation of the DRDV to model functions comprising WELL-KNOWN-PARAMETERS (WNP) and NOT-WELL-KNOWN-PARAMETERS (NWP); and the POST is configured to generate reports of the AEV to the GUI.

This general system summary may be augmented by the various elements described herein to produce a wide variety of invention embodiments consistent with this overall design description.

Dose Rate/Spectroscopy Alternate System Summary

Within the present invention scope, some system embodiments may incorporate optimization of dose rate and/or spectroscopy measurements. This present invention alternate system anticipates a wide variety of variations in the basic theme of construction, but can be generalized as a radiation analysis system comprising:

(a) radiation source detection subsystem (RSDS);
(b) batch definition processor (BDFP);
(c) pre-analysis processor (PREP);
(d) measurement optimization processor (MOPT); and
(e) post-analysis processor (POST);
wherein
the RSDS is configured with a radiation sensor (RSEN) to detect radiation emitted from a radiation sample (RSAM) and output digital radiation detection values (DRDV) associated with the emitted radiation;
the BDFP is configured to accept user input from a graphical user interface (GUI) to define radiation analysis parameters (RAP) to be used in analyzing the RS;
the PREP is configured to read the DRDV and perform a preliminary analysis to define a RSAM measurement estimate (RSME);
the MOPT is configured to analyze the DRDV and perform an automated measurement value optimization (AMVO) to generate absolute measurement values (AMV) for the RSAM using the RAP and the RSME as a starting point for the analysis;
the MOPT is configured to rank the AMVO with a Figure-Of-Merit (FOM); and
the POST is configured to generate reports of the AEV to the GUI.

This general system summary may be augmented by the various elements described herein to produce a wide variety of invention embodiments consistent with this overall design description.

Inspection of the various system architectures described herein such as depicted in FIG. 1 (0100) reveals that the same techniques taught herein as applied to spectroscopy measurements can be applied equally to dose rate measurements alone, or in conjunction with spectroscopy measurements in a hybrid radiation detector configuration. Thus, the optimization techniques described herein are not limited by the type of radiation detector or the type of information obtained from a radiation measurement.

Method Summary

The present invention method anticipates a wide variety of variations in the basic theme of implementation, but can be generalized as a radiation analysis method, the method operating in conjunction with a radiation analysis system comprising:

(a) radiation source detection subsystem (RSDS);
(b) batch definition processor (BDFP);
(c) pre-analysis processor (PREP);
(d) efficiency optimization processor (EOPT); and
(e) post-analysis processor (POST);
wherein
the RSDS is configured with a radiation sensor (RSEN) to detect radiation emitted from a radiation sample (RSAM) and output digital radiation detection values (DRDV) associated with the emitted radiation;
the BDFP accepts user input from a graphical user interface (GUI) to configure radiation analysis parameters (RAP) to be used in analyzing the RS;
the PREP reads the DRDV and performs a preliminary analysis to define a RSAM efficiency estimate (RSEE);
the EOPT analyses the DRDV and performs an automated efficiency value optimization (AEVO) to generate absolute efficiency values (AEV) for the RSAM using the RAP and the RSEE as a starting point for the analysis;
the EOPT ranks the AEVO with a Figure-Of-Merit (FOM) based on the correlation of the DRDV to model functions comprising WELL-KNOWN-PARAMETERS (WNP) and NOT-WELL-KNOWN-PARAMETERS (NWP); and
the POST generates reports of the AEV to the GUI;
wherein the method comprises the steps of:

(1) defining a radiation source/sensor environment (RSSE) model comprising a mathematical model of the RSAM and the RSEN;
(2) defining default/expected/fixed dimensions/values for parameters associated with the RSSE model;
(3) defining values/parameters that are model variables within the RSSE model;
(4) defining a range of variation and distribution shape for each the model variable;
(5) randomly selecting a value for each the model variable using distribution shape/limits to create a test mathematical model of a possible source-detector measurement configuration in the RSSE;
(6) selecting optimization benchmark(s) available from data measured from the RSDS;
(7) computing the source-detector measurement efficiency (SDME) in the RSEE using the test mathematical model;
(8) computing the Figure-Of-Merit (FOM) for the SDME;
(9) determining if statistical accuracy has been reached in the FOM, and if not, proceeding to step (5);
(10) selecting a "best" mathematical model(s) by either:
    (a) selecting a predefined number of the test mathematical models that correspond to optimal values of the FOM for the SDME using a Best Random Fit; or
    (b) alternatively selecting an optimal test mathematical model using a focused Smart Routine search algorithm;
(11) calculating the mean and standard deviation describing the uncertainty of the SDME for the "best" mathematical model(s); and
(12) optionally recalculating step (11) for each of several energies to evaluate the SDME, then proceeding to step (5)

Within the present invention scope, some embodiments may incorporate an overall evaluation of energy response within the RSEE via reevaluation of the test mathematical model using a number of energy values as indicated in step (12). This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Dose Rate/Spectroscopy Alternate Method Summary

Within the present invention scope, some embodiments may incorporate dose rate and/or spectroscopy optimization procedures. Thus, the present invention method anticipates a wide variety of variations in the basic theme of implementation, but alternatively can be generalized as a radiation analysis method comprising:

(1) locating a set of radiation detectors at various preselected measurement geometry locations with respect to a radioactive item;

(2) recording radiation data measurement values collected from the radiation detectors at the pre-selected measurement geometry locations;
(3) transferring the radiation data to a computer system;
(4) activating an automated optimization process on the computer system;
(5) reading an initial geometry parameters file with the computer system and retrieving inputs from predefined files to define optimization process setup parameters;
(6) using an initial geometry model to calculate with the computer system radiation detection values at all the pre-selected measurement geometry locations;
(7) computing with the computer system the Figure-Of-Merit (FOM) for selected benchmarks;
(8) determining with the computer system if the same geometry model gives consistent results for all measurements at all measurement locations, and if so, proceeding to step (12);
(9) varying with the computer system the variable geometry parameters using a Best Random Fit Routine or Smart Routine;
(10) for each model or iteration, calculating with the computer system a new radiation value and the benchmark FOM by proceeding to step (7);
(11) selecting with the computer system an optimum geometry model as the one that gives consistent results with all the measurement values;
(12) reporting optimized radiation measurement values to a user with the computer system; and
(13) calculating with the computer system measurement values at a selected location with respect to the radioactive item.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

It should be noted that this generalized method integrates the teachings of FIG. 6 (0600), FIG. 7 (0700), and FIG. 16 (1600), in that the set of radiation detectors may comprise any combination of dose rate detectors and spectroscopy detectors.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the BDFP further comprises a configuration function selected from the group consisting of: energy calibration; peak shape calibration; spectral file physical sample/container definition; variable geometry parameter selection; benchmark FOM selection; optimization routine selection; and analysis setup parameter selection.

An embodiment wherein the PREP further comprises an analysis function selected from the group consisting of: Peak Locate; Peak Area; Initial Geometry File Efficiency Correction; Nuclide Identification; Nuclide Line Activities; and Isotopic Analysis.

An embodiment wherein the EOPT further comprises execution of an efficiency optimization algorithm selected from the group consisting of: Best Random Fit and Smart Routine.

An embodiment wherein the EOPT further comprises execution of an optimization benchmark algorithm selected from the group consisting of: MGAU/MGA; FRAM; Line Activity Consistency Evaluation (LACE); User Defined Isotopics; U Mass; Pu Mass; and Multiple Count.

An embodiment wherein the EOPT further comprises execution of an efficiency optimization Smart Routine algorithm selected from the group consisting of: Sequential Optimization; Downhill Simplex; Particle Swarm; Quasi-Newton; and Marquardt.

An embodiment wherein the POST further comprises execution of a process selected from the group consisting of: efficiency correction with optimized efficiencies; nuclide identification; activity quantification; and measurement uncertainty estimation.

An embodiment wherein the RSAM comprises a Special Nuclear Material (SNM) selected from the group consisting of: $^{235}$U, $^{238}$U, $^{239}$Pu, and $^{238}$Pu.

An embodiment wherein the RSAM comprises a radioactive nuclide other than SNM.

An embodiment wherein the GUI further comprises a geometry composition editor configured to graphically define the Geometry Information Setup (GIS) measurements used to measure the DRDV associated with the RS.

An embodiment wherein the optimization of the geometry model can be carried out based on consistency between spectroscopy data as well as dose rate data.

An embodiment wherein the set of radiation detectors comprises one or more dose rate detectors.

An embodiment wherein the set of radiation detectors comprises one or more spectroscopy detectors.

An embodiment wherein the set of radiation detectors comprises one or more dose rate detectors and one or more spectroscopy detectors.

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

CONCLUSION

A radiation analysis system/method that automatically optimizes the efficiency calibration of a counting system based on benchmark data and variable parameters associated with radiation source/sensor/environment (RSSE) combinations is disclosed. The system/method bifurcates RSSE context (SSEC) model parameters into WELL-KNOWN (fixed) parameters (WNP) and NOT-WELL-KNOWN (variable) parameters (NWP). The NWP have associated lower/upper limit values (LULV) and a shape distribution (LUSD) describing NWP characteristics. SSEC models are evaluated using randomized statistical NWP variations or by using smart routines that perform a focused search within the LULV/LUSD to generate model calibration values (MCV) and calibration uncertainty values (UCV) describing the overall SSEC efficiencies. Sensor measurements using the MCV/UCV generate a measurement value and uncertainty estimation value. An exemplary embodiment optimizes geometry models of radiation sources by benchmarking with respect to measurement data from spectroscopy detectors and/or dose rate detectors.

What is claimed is:

1. A radiation analysis system comprising:
   (a) radiation source detection subsystem (RSDS);
   (b) batch definition processor (BDFP);
   (c) pre-analysis processor (PREP);
   (d) efficiency optimization processor (EOPT); and
   (e) post-analysis processor (POST);
   wherein
   said RSDS is configured with a radiation sensor (RSEN) to detect radiation emitted from a radiation sample (RSAM) and output digital radiation detection values (DRDV) associated with said emitted radiation;
   said BDFP is configured to accept user input from a graphical user interface (GUI) to define radiation analysis parameters (RAP) to be used in analyzing said RSAM;
   said PREP is configured to read said DRDV and perform a preliminary analysis to define a RSAM efficiency estimate (RSEE);
   said EOPT is configured to analyze said DRDV and perform an automated efficiency value optimization (AEVO) to generate absolute efficiency values (AEV) for said RSAM using said RAP and said RSEE as a starting point for said analysis;
   said EOPT is configured to rank said AEVO with a Figure-Of-Merit (FOM) based on the correlation of said DRDV to model functions comprising WELL-KNOWN-PARAMETERS (WNP) and NOT-WELL-KNOWN-PARAMETERS (NWP); and
   said POST is configured to generate reports of said AEV to said GUI.

2. The radiation analysis system of claim 1 wherein said BDFP further comprises a configuration function selected from the group consisting of: energy calibration; peak shape calibration; spectral file physical sample/container definition; variable geometry parameter selection; benchmark FOM selection; optimization routine selection; and analysis setup parameter selection.

3. The radiation analysis system of claim 1 wherein said PREP further comprises an analysis function selected from the group consisting of: Peak Locate; Peak Area; Initial Geometry File Efficiency Correction; Nuclide Identification; Nuclide Line Activities; and Isotopic Analysis.

4. The radiation analysis system of claim 1 wherein said EOPT further comprises execution of an efficiency optimization algorithm selected from the group consisting of: Best Random Fit and Smart Routine.

5. The radiation analysis system of claim 1 wherein said EOPT further comprises execution of an optimization benchmark algorithm selected from the group consisting of: Multigroup Analysis for Uranium/Multigroup Analysis (MGAU/MGA); Fixed Energy Response Function Analysis with Multiple Efficiencies (FRAM); Line Activity Consistency Evaluation (LACE); User Defined Isotopics; U Mass; Pu Mass; and Multiple Count.

6. The radiation analysis system of claim 1 wherein said EOPT further comprises execution of an efficiency optimization Smart Routine algorithm selected from the group consisting of: Sequential Optimization; Downhill Simplex; Particle Swarm; Quasi-Newton; and Marquardt.

7. The radiation analysis system of claim 1 wherein said POST further comprises execution of a process selected from the group consisting of: efficiency correction with optimized efficiencies; nuclide identification; activity quantification; and measurement uncertainty estimation.

8. The radiation analysis system of claim 1 wherein said RSAM comprises a Special Nuclear Material (SNM) selected from the group consisting of: $^{235}$U, $^{238}$U, $^{239}$Pu, and $^{238}$Pu.

9. The radiation analysis system of claim 1 wherein said RSAM comprises a radioactive nuclide other than SNM.

10. The radiation analysis system of claim 1 wherein said GUI further comprises a geometry composition editor configured to graphically define the Geometry Information Setup (GIS) measurements used to measure said DRDV associated with said RSAM.

11. A radiation analysis method, said method operating in conjunction with a radiation analysis system, said system comprising:
   (a) radiation source detection subsystem (RSDS);
   (b) batch definition processor (BDFP);
   (c) pre-analysis processor (PREP);
   (d) efficiency optimization processor (EOPT); and
   (e) post-analysis processor (POST);
   wherein
   said RSDS is configured with a radiation sensor (RSEN) to detect radiation emitted from a radiation sample (RSAM) and output digital radiation detection values (DRDV) associated with said emitted radiation;
   said BDFP is configured to accept user input from a graphical user interface (GUI) to define radiation analysis parameters (RAP) to be used in analyzing said RSAM;
   said PREP is configured to read said DRDV and perform a preliminary analysis to define a RSAM efficiency estimate (RSEE);
   said EOPT is configured to analyze said DRDV and perform an automated efficiency value optimization (AEVO) to generate absolute efficiency values (AEV) for said RSAM using said RAP and said RSEE as a starting point for said analysis;
   said EOPT is configured to rank said AEVO with a Figure-Of-Merit (FOM) based on the correlation of said DRDV to model functions comprising WELL-KNOWN-PARAMETERS (WNP) and NOT-WELL-KNOWN-PARAMETERS (NWP); and said POST is configured to generate reports of said AEV to said GUI;

wherein said method comprises the steps of:
(1) defining a radiation source/sensor environment (RSSE) model comprising a mathematical model of said RSAM and said RSEN;
(2) defining default/expected/fixed dimensions/values for parameters associated with said RSSE model;
(3) defining values/parameters that are model variables within said RSSE model;
(4) defining a range of variation and distribution shape for each said model variable;
(5) randomly selecting a value for each said model variable using distribution shape/limits to create a test mathematical model of a possible source-detector measurement configuration in said RSEE;
(6) selecting optimization benchmark(s) available from data measured from said RSDS;
(7) computing the source-detector measurement efficiency (SDME) in said RSEE using said test mathematical model;
(8) computing the Figure-Of-Merit (FOM) for said SDME;
(9) determining if statistical accuracy has been reached in said FOM, and if not, proceeding to said step (5);
(10) selecting a best mathematical model(s) by either:
  (a) selecting a predefined number of said test mathematical models that correspond to optimal values of said FOM for said SDME using a Best Random Fit; or
  (b) alternatively selecting an optimal test mathematical model using a focused Smart Routine search algorithm; and
(11) calculating the mean and standard deviation describing the uncertainty of said SDME for said best mathematical model(s).

12. The radiation analysis method of claim 11 wherein said BDFP further comprises a configuration function selected from the group consisting of: energy calibration; peak shape calibration; spectral file physical sample/container definition; variable geometry parameter selection; benchmark FOM selection; optimization routine selection; and analysis setup parameter selection.

13. The radiation analysis method of claim 11 wherein said PREP further comprises an analysis function selected from the group consisting of: Peak Locate; Peak Area; Initial Geometry File Efficiency Correction; Nuclide Identification; Nuclide Line Activities; and Isotopic Analysis.

14. The radiation analysis method of claim 11 wherein said EOPT further comprises execution of an efficiency optimization algorithm selected from the group consisting of: Best Random Fit and Smart Routine.

15. The radiation analysis method of claim 11 wherein said EOPT further comprises execution of an optimization benchmark algorithm selected from the group consisting of: Multigroup Analysis for Uranium/Multigroup Analysis (MGAU/MGA); Fixed Energy Response Function Analysis with Multiple Efficiencies (FRAM); Line Activity Consistency Evaluation (LACE); User Defined Isotopics; U Mass; Pu Mass; and Multiple Count.

16. The radiation analysis method of claim 11 wherein said EOPT further comprises execution of an efficiency optimization Smart Routine algorithm selected from the group consisting of: Sequential Optimization; Downhill Simplex; Particle Swarm; Quasi-Newton; and Marquardt.

17. The radiation analysis method of claim 11 wherein said POST further comprises execution of a process selected from the group consisting of: efficiency correction with optimized efficiencies; nuclide identification; activity quantification; and measurement uncertainty estimation.

18. The radiation analysis method of claim 11 wherein said RSAM comprises a Special Nuclear Material (SNM) selected from the group consisting of: $^{235}$U, $^{238}$U, $^{239}$Pu, and $^{238}$Pu.

19. The radiation analysis method of claim 11 wherein said RSAM comprises a radioactive nuclide other than SNM.

20. The radiation analysis method of claim 11 wherein said GUI further comprises a geometry composition editor configured to graphically define the Geometry Information Setup (GIS) measurements used to measure said DRDV associated with said RSAM.

21. A radiation analysis system comprising:
(a) radiation source detection subsystem (RSDS);
(a) batch definition processor (BDFP);
(b) pre-analysis processor (PREP);
(c) measurement optimization processor (MOPT); and
(d) post-analysis processor (POST);
wherein
said RSDS is configured with a radiation sensor (RSEN) to detect radiation emitted from a radiation sample (RSAM) and output digital radiation detection values (DRDV) associated with said emitted radiation;
said BDFP is configured to accept user input from a graphical user interface (GUI) to define radiation analysis parameters (RAP) to be used in analyzing said RSAM;
said PREP is configured to read said DRDV and perform a preliminary analysis to define a RSAM measurement estimate (RSME);
said MOPT is configured to analyze said DRDV and perform an automated measurement value optimization (AMVO) to generate absolute measurement values (AMV) for said RSAM using said RAP and said RSME as a starting point for said analysis;
said MOPT is configured to rank said AMVO with a Figure-Of-Merit (FOM); and
said POST is configured to generate reports of said AEV to said GUI.

22. The radiation analysis system of claim 21 wherein said RSEN further comprises one or more dose rate detectors.

23. The radiation analysis system of claim 21 wherein said RSEN further comprises one or more spectroscopy detectors.

24. The radiation analysis system of claim 21 wherein said RSEN further comprises one or more dose rate detectors and one or more spectroscopy detectors.

25. A radiation analysis method comprising:
(1) locating a set of radiation detectors at various preselected measurement geometry locations with respect to a radioactive item;
(2) recording radiation data measurement values collected from said radiation detectors at said pre-selected measurement geometry locations;
(3) transferring said radiation data to a computer system;
(4) activating an automated optimization process on said computer system;
(5) reading an initial geometry parameters file with said computer system and retrieving inputs from predefined files to define optimization process setup parameters;
(6) using an initial geometry model to calculate with said computer system radiation detection values at all said pre-selected measurement geometry locations;
(7) computing with said computer system the Figure-Of-Merit (FOM) for selected benchmarks;

(8) determining with said computer system if the same geometry model gives consistent results for all measurements at all measurement locations, and if so, proceeding to step (11);
(9) varying with said computer system the variable geometry parameters using a Best Random Fit Routine or Smart Routine;
(10) for each model or iteration, calculating with said computer system a new radiation value and the benchmark FOM by proceeding to said step (7);
(11) selecting with said computer system an optimum geometry model as the one that gives consistent results with all said measurement values;
(12) reporting optimized radiation measurement values to a user with said computer system; and
(13) calculating with said computer system measurement values at a selected location with respect to said radioactive item.

26. The radiation analysis method of claim 25 wherein said set of radiation detectors comprises one or more dose rate detectors.

27. The radiation analysis method of claim 25 wherein said set of radiation detectors comprises one or more spectroscopy detectors.

28. The radiation analysis method of claim 25 wherein said set of radiation detectors comprises one or more dose rate detectors and one or more spectroscopy detectors.

* * * * *